(12) United States Patent
Terada et al.

(10) Patent No.: US 10,000,619 B2
(45) Date of Patent: *Jun. 19, 2018

(54) DIAPHRAGM

(75) Inventors: Junpei Terada, Settsu (JP); Daisuke Ota, Settsu (JP); Masanori Kitaichi, Settsu (JP); Shoji Fukuoka, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 179 days.

This patent is subject to a terminal disclaimer.

(21) Appl. No.: 14/234,346

(22) PCT Filed: Aug. 16, 2012

(86) PCT No.: PCT/JP2012/071248
§ 371 (c)(1),
(2), (4) Date: Jan. 22, 2014

(87) PCT Pub. No.: WO2013/027783
PCT Pub. Date: Feb. 28, 2013

(65) Prior Publication Data
US 2014/0163158 A1    Jun. 12, 2014

Related U.S. Application Data

(60) Provisional application No. 61/527,540, filed on Aug. 25, 2011.

(51) Int. Cl.
*C08K 3/04* (2006.01)
*F16J 3/02* (2006.01)

(52) U.S. Cl.
CPC .. *C08K 3/04* (2013.01); *F16J 3/02* (2013.01)

(58) Field of Classification Search
CPC ........................................................ F16J 3/02
See application file for complete search history.

(56) References Cited

U.S. PATENT DOCUMENTS

| | | | |
|---|---|---|---|
| 4,606,952 A * | 8/1986 | Sugimoto | B32B 25/14 428/36.8 |
| 4,983,680 A * | 1/1991 | Ojakaar | C08F 8/00 525/281 |
| 6,515,064 B1 | 2/2003 | Tanaka et al. | |
| 8,754,161 B2 * | 6/2014 | Terada | C08L 15/02 524/495 |
| 9,006,328 B2 * | 4/2015 | Ota | C08K 5/0025 524/495 |
| 9,045,614 B2 * | 6/2015 | Ota | C08K 5/0025 |
| 2004/0006160 A1 | 1/2004 | Matsuda et al. | |
| 2010/0266839 A1 | 10/2010 | Omura et al. | |
| 2011/0274861 A1 * | 11/2011 | Stevens | C08L 27/16 428/36.91 |
| 2012/0077926 A1 * | 3/2012 | Ota | C08K 3/04 524/495 |
| 2012/0077939 A1 * | 3/2012 | Ota | C08K 3/04 525/326.3 |
| 2012/0196974 A1 * | 8/2012 | Iwamoto | C08K 3/04 524/546 |
| 2013/0225758 A1 * | 8/2013 | Yano | B29D 22/02 524/546 |

FOREIGN PATENT DOCUMENTS

| | | | | |
|---|---|---|---|---|
| CN | 101871406 A | 10/2010 | | |
| EP | 0634456 A1 | 1/1995 | | |
| EP | 1741748 A1 | 1/2007 | | |
| GB | 953152 A * | 3/1964 | ............. | C08F 16/12 |
| JP | 62-53353 A | 3/1987 | | |
| JP | 3-122153 A | 5/1991 | | |
| JP | 4-171366 A | 6/1992 | | |
| JP | 4-323245 A | 11/1992 | | |
| JP | 11-80536 A | 3/1999 | | |
| JP | 2002-019030 A | 1/2002 | | |
| JP | 2003-13041 A | 1/2003 | | |
| JP | 2003-201401 A | 7/2003 | | |
| JP | 2004-39538 A | 2/2004 | | |
| JP | 2004-323994 A | 11/2004 | | |
| JP | 2007-262196 A | 10/2007 | | |
| JP | 2011-195761 A | 10/2011 | | |
| WO | 95/22575 A1 | 8/1995 | | |
| WO | 00/42093 A1 | 7/2000 | | |
| WO | 2011/068835 A1 | 6/2011 | | |

OTHER PUBLICATIONS

Communication dated Apr. 10, 2015 from the European Patent Office in counterpart application No. 12825289.7.
International Search Report for PCT/JP2012/071248 dated Nov. 27, 2012.
International Preliminary Report on Patentability and Written Opinion of the International Searching Authority dated Feb. 25, 2014 for PCT Appln. No. PCT/JP2012/071248.
Asahi Chem. Ind. Co., Ltd., machine translation of JP Patent Application Publication No. 3-122153, published May 24, 1991.

* cited by examiner

*Primary Examiner* — Nicole M Buie-Hatcher
(74) *Attorney, Agent, or Firm* — Sughrue Mion, PLLC

(57) ABSTRACT

A diaphragm including a cross-linked fluororubber layer obtained by cross-linking a fluororubber composition containing a fluororubber (A) and a carbon black (B), the cross-linked fluororubber layer having a loss modulus E" of 400 kPa or higher and 6,000 kPa or lower determined by a dynamic viscoelasticity test under conditions of measurement temperature: 160° C., tensile strain: 1%, static tension under a constant static load condition for measuring strain distribution: 157 cN, and frequency: 10 Hz.

11 Claims, No Drawings

DIAPHRAGM

CROSS-REFERENCE TO RELATED APPLICATION

This application is a National Stage of International Application No. PCT/JP2021/071248 filed Aug. 16, 2012, which claims benefit of U.S. Provisional Application No. 61/527,540 filed Aug. 25, 2011, the contents of all of which are incorporated herein by reference in their entirety.

TECHNICAL FIELD

The present invention relates to a diaphragm.

BACKGROUND ART

A diaphragm is used for, for example, cars, gas appliances, and air conditioners as a part of a pump, carburetor, bulb, and the like.

Patent Document 1 discloses a diaphragm for filter press which is made of a vulcanized rubber with high thermal conductivity which comprises: 100 parts by weight of a raw material rubber such as polyisoprene rubber; and 100 to 250 parts by weight of aluminum hydroxide and/or magnesium hydroxide.

Patent Document 2 discloses a diaphragm containing a vulcanized rubber and reinforcement fibers for the rubber. The reinforcement fibers are in the form of a fabric for rubber reinforcement, either the warps or the wefts are woven to have a lower density portion and a higher density portion, and the higher density portion is in the peripheral part while the lower density portion is in the central part, in order to provide a diaphragm which has an excellent uniformity in deformation by high sealing pressure, has a low rigidity owing to the lower fabric density of the central part than that of the peripheral part, and has an excellent uniformity in rubber thickness as a molded product.

Patent Document 3, in order to provide a diaphragm for fuel system excellent in dimensional accuracy, discloses a diaphragm for fuel system produced from a modified acrylic rubber composition containing a specific acrylic rubber and polyvinylidene fluoride in a predetermined proportion.

CITATION LIST

Patent Document

Patent Document 1: JP 2007-262196 A
Patent Document 2: JP 2004-323994 A
Patent Document 3: JP 4-323245 A

SUMMARY OF INVENTION

Technical Problem

A diaphragm for fuel system used for gasoline pipes of cars is required to have heat resistance (heat-aging resistance), oil resistance, and gasoline resistance. Especially, a diaphragm used under a high temperature condition is required to be excellent in mechanical properties at high temperatures. Conventional diaphragms, however, are not satisfactory in the mechanical properties at high temperatures.

An object of the present invention is to provide a diaphragm which is excellent in mechanical properties at high temperatures.

Solution to Problem

The present inventors have performed diligent studies and focused on the loss modulus E". We have found that a fluororubber diaphragm having a specific loss modulus has excellent mechanical properties at high temperatures, specifically a low compression set at high temperatures and a high fatigue resistance. Thereby, we have completed the present invention.

In other words, the present invention relates to a diaphragm comprising a cross-linked fluororubber layer obtained by cross-linking a fluororubber composition containing a fluororubber (A) and a carbon black (B), wherein the cross-linked fluororubber layer has a loss modulus E" of 400 kPa or higher and 6,000 kPa or lower determined by a dynamic viscoelasticity test under conditions of measurement temperature: 160° C., tensile strain: 1%, static tension under a constant static load condition for measuring strain distribution: 157 cN, and frequency: 10 Hz.

Further, the cross-linked fluororubber layer preferably has a storage modulus E' of 1,500 kPa or higher and 20,000 kPa or lower determined by a dynamic viscoelasticity test under conditions of measurement temperature: 160° C., tensile strain: 1%, static tension under a constant static load condition for measuring strain distribution: 157 cN, and frequency: 10 Hz.

The fluororubber composition preferably contains 5 to 50 parts by mass of carbon black (B) to 100 parts by mass of the fluororubber (A).

The carbon black (B) is preferably a carbon black having a nitrogen adsorption specific surface area ($N_2SA$) of 5 to 180 $m^2/g$ and a dibutyl phthalate (DBP) oil absorption of 40 to 180 ml/100 g. This is because such a carbon black forms a carbon gel network reinforcing structure with the fluororubber and thereby improves mechanical properties at high temperatures.

Preferable examples of the fluororubber (A) include vinylidene fluoride copolymer rubber, tetrafluoroethylene/perfluoro(alkyl vinyl ether) copolymer rubber, and tetrafluoroethylene/propylene copolymer rubber in terms of their good heat resistance (heat-aging resistance) and oil resistance.

The fluororubber composition may further contain a cross-linking agent (C) and/or a cross-linking aid (D).

The cross-linked fluororubber layer preferably has an elongation at break of 100 to 700% and a tensile strength at break of 1.0 to 20 MPa each at 160° C. for improved characteristics required for a diaphragm.

Further, the cross-linked fluororubber layer preferably has an elongation at break of 90 to 700% and a tensile strength at break of 1.0 to 20 MPa each at 200° C. for improved characteristics required for a diaphragm.

Furthermore, the cross-linked fluororubber layer preferably has an elongation at break of 80 to 700% and a tensile strength at break of 1.0 to 20 MPa each at 230° C. for improved characteristics required for a diaphragm.

Advantageous Effect of the Invention

The present invention provides a diaphragm which is excellent in mechanical properties at high temperatures.

DESCRIPTION OF EMBODIMENT

The present invention relates to a diaphragm comprising a cross-linked fluororubber layer obtained by cross-linking a fluororubber composition containing a fluororubber (A) and a carbon black (B), wherein the cross-linked fluororubber layer has a loss modulus E" of 400 kPa or higher and 6000 kPa or lower determined by a dynamic viscoelasticity test (measurement mode: tensile, chuck distance: 20 mm, measurement temperature: 160° C., tensile strain: 1%, static tension under a constant static load condition for measuring strain distribution: 157 cN, frequency: 10 Hz).

The diaphragm of the present invention is excellent in mechanical strength at high temperatures because of containing a cross-linked fluororubber layer having a loss modulus E" of 400 kPa or higher and 6000 kPa or lower.

Respective features will be described below.

The fluororubber (A) in the present invention preferably has a polymerization unit derived from at least one monomer selected from the group consisting of tetrafluoroethylene (TFE), vinylidene fluoride (VdF), and perfluoroethylenic unsaturated compounds (e.g. hexafluoropropylene (HFP) and perfluoro(alkyl vinyl ether) (PAVE)) represented by formula (1):

$$CF_2=CF-Rf^a \quad (1)$$

(wherein $Rf^a$ is $-CF_3$ or $-ORf^b$ ($Rf^b$ is a C1-C5 perfluoroalkyl group).

The fluororubber (A) is preferably a non-perfluoro fluororubber or a perfluoro fluororubber.

Examples of the non-perfluoro fluororubber include: vinylidene fluoride (VdF) fluororubber; tetrafluoroethylene (TFE)/propylene (Pr) fluororubber; TFE/Pr/VdF fluororubber; ethylene (Et)/HFP fluororubber; Et/HFP/VdF fluororubber; Et/HFP/TFE fluororubber; fluorosilicone fluororubber; and fluorophosphazene fluororubber. Each of these may be used alone, or any of these may be used in combination. More suitable among these is at least one selected from the group consisting of VdF fluororubber, TFE/Pr fluororubber, and TFE/Pr/VdF fluororubber because of their good heat-aging resistance and oil resistance. Vdf fluororubber is still more preferable.

The VdF fluororubber preferably has 20 mol % or more, more preferably 40 mol % or more, further preferably 45 mol %, and particularly preferably 50 mol % of a polymerization unit derived from VdF (herein after also referred to as a VdF unit), each to the total amount of the VdF unit and polymerization units derived from other comonomers. Also, the VdF unit is preferably 90 mol % or less, more preferably 85 mol % or less, and further preferably 80 mol % or less to the total amounts of the VdF unit and polymerization units derived from other comonomers.

The other comonomers in the VdF fluororubber are not particularly limited as long as they are copolymerizable with VdF. Examples thereof include fluoromonomers such as TFE, HFP, PAVE, chlorotrifluoroethylene (CTFE), trifluoroethylene, trifluoropropylene, tetrafluoropropylene, pentafluoropropylene, trifluorobutene, tetrafluoroisobutene, hexafluoroisobutene, vinyl fluoride, iodine-containing fluorinated vinyl ether, and a fluorine-containing monomer (2) represented by formula (2):

$$CH_2=CFRf \quad (2)$$

wherein Rf is a linear or branched C1-C12 fluoroalkyl group; fluorine-free monomers such as ethylene (Et), propylene (Pr), and alkyl vinyl ethers; monomers giving a cross-linkable group (a curing site); and a reactive emulsifier. Each of these monomers and compounds may be used alone, or two or more of these may be used in combination.

The PAVE is preferably perfluoro(methyl vinyl ether) (PMVE), or perfluoro(propyl vinyl ether) (PPVE), and is particularly preferably PMVE.

The other comonomer may be one represented by the formula:

$$CF_2=CFOCF_2ORf^c$$

wherein $Rf^c$ is a linear or branched C1-C6 perfluoroalkyl group, a cyclic C5-C6 perfluoroalkyl group, or a linear or branched C2-C6 perfluorooxyalkyl group having 1 to 3 oxygen atoms. Preferable among these is $CF_2=CFOCF_2OCF_3$, $CF_2=CFOCF_2OCF_2CF_3$, or $CF_2=CFOCF_2OCF_2CF_2OCF_3$.

The fluorine-containing monomer (2) of formula (2) is preferably a monomer whose Rf is a linear fluoroalkyl group, and more preferably a monomer whose Rf is a linear perfluoroalkyl group. The carbon number of Rf is preferably 1 to 6. Examples of the fluorine-containing monomer (2) of formula (2) include $CH_2=CFCF_3$, $CH_2=CFCF_2CF_3$, $CH_2=CFCF_2CF_2CF_3$, and $CH_2=CFCF_2CF_2CF_2CF_3$. Preferable among these is 2,3,3,3-tetrafluoropropylene represented as $CH_2=CFCF_3$.

The VdF rubber is preferably at least one copolymer selected from the group consisting of a VdF/HFP copolymer, VdF/CTFE copolymer, VdF/CTFE/TFE copolymer, VdF/PAVE copolymer, VdF/HFP/TFE copolymer, VdF/PAVE/TFE copolymer, VdF/HFP/PAVE copolymer, VdF/HFP/TFE/PAVE copolymer, VdF/TFE/propyrene (Pr) copolymer, VdF/ethylene (Et)/HFP copolymer, and copolymer of VdF/fluorine-containing monomer (2) of formula (2). Further, the rubber more preferably has a polymerization unit derived from at least one comonomer other than VdF selected from the group consisting of TFE, HFP, and PAVE. Preferable among these is at least one copolymer selected from the group consisting of a VdF/HFP copolymer, copolymer of VdF/fluorine-containing monomer (2) of formula (2), VdF/PAVE copolymer, VdF/HFP/TFE copolymer, VdF/PAVE/TFE copolymer, VdF/HFP/PAVE copolymer, and VdF/HFP/TFE/PAVE copolymer. More preferable among these is at least one copolymer selected from the group consisting of a VdF/HFP copolymer, VdF/HFP/TFE copolymer, copolymer of VdF/fluorine-containing monomer (2) of formula (2), and VdF/PAVE copolymer. Particularly preferable among these is at least one copolymer selected from the group consisting of a VdF/HFP copolymer, copolymer of VdF/fluorine-containing monomer (2) of formula (2), and VdF/PAVE copolymer.

In the VdF/HFP copolymer, the ratio of VdF/HFP is preferably (45 to 85)/(55 to 15) (mol %), more preferably (50 to 80)/(50 to 20) (mol %), and further preferably (60 to 80)/(40 to 20) (mol %).

The ratio of VdF/HFP is also preferably (48 to 85)/(52 to 15) (mol %), more preferably (50 to 78)/(50 to 22) (mol %), and further preferably (55 to 77)/(45 to 23) (mol %).

In the VdF/PAVE copolymer, the ratio of VdF/PAVE is preferably (65 to 90)/(35 to 10) (mol %).

The ratio of VdF/PAVE is also preferably (48 to 85)/(52 to 15) (mol %), more preferably (50 to 78)/(50 to 22) (mol %), and further preferably (55 to 77)/(45 to 23) (mol %).

In the VdF/HFP/TFE copolymer, the ratio of VdF/HFP/TFE is preferably (48 to 85)/(52 to 15)/(1 to 10) (mol %), more preferably (50 to 78)/(50 to 22)/(1 to 9) (mol %), and further preferably (55 to 77)/(45 to 23)/(1 to 8).

In the VdF/PAVE/TFE copolymer, the ratio of VdF/PAVE/TFE is preferably (40 to 80)/(15 to 35)/(3 to 40) (mol %).

In the VdF/PAVE/TFE copolymer, the ratio of VdF/PAVE/TFE is also preferably (48 to 85)/(52 to 15)/(1 to 10)

(mol %), more preferably (50 to 78)/(50 to 22)/(1 to 9) (mol %) and further preferably (55 to 77)/(45 to 23)(1 to 8) (mol %).

In the VdF/HFP/PAVE copolymer, the ratio of VdF/HFP/PAVE is preferably (65 to 90)/(3 to 25)/(3 to 25) (mol %).

In the VdF/HFP/PAVE copolymer, the ratio of VdF/HFP/PAVE is also preferably (48 to 85)/(15 to 52)/(1 to 25) (mol %), more preferably (50 to 78)/(22 to 50)/(1 to 20) (mol %), and further preferably (55 to 77)/(45 to 23)/(1 to 15) (mol %).

In the VdF/HFP/TFE/PAVE copolymer, the ratio of VdF/HFP/TFE/PAVE is preferably (40 to 90)/(0 to 25)/(0 to 40)/(3 to 35) (mol %), and more preferably (40 to 80)/(3 to 25)/(3 to 40)/(3 to 25) (mol %).

The ratio is also preferably (48 to 85)/(15 to 52)/(1 to 10)/(1 to 25) (mol %), more preferably (50 to 78)/(22 to 50)/(1 to 9)/(1 to 20) (mol %), and further preferably (55 to 77)/(23 to 45)/(1 to 8)/(1 to 15) (mol %)

In the copolymer based on VdF/fluorine-containing monomer (2) of formula (2), the mol % ratio of VdF/fluorine-containing monomer (2) units is preferably 85/15 to 20/80; the mol % ratio of monomer units other than the VdF and fluorine-containing monomer (2) units is preferably 0 to 50 mol % in all of the monomer units; the mol % ratio of the VdF/fluorine-containing monomer (2) units is more preferably 80/20 to 20/80. The mol % ratio of the VdF/fluorine-containing monomer (2) units is also preferably 85/15 to 50/50, and the ratio of monomer units other than the VdF and fluorine-containing monomer (2) units is also preferably 1 to 50 mol % in all of the monomer units. The mol % ratio of the VdF/fluorine-containing monomer (2) units is also preferably 48/52 to 85/15. The mol % ratio of the VdF/fluorine-containing monomer (2) units is more preferably 50/50 to 78/22, and the amount of monomer units other than the VdF and fluorine-containing monomer (2) units is more preferably 0 to 50 mol % in all of the monomer units. The mol % ratio of the VdF/fluorine-containing monomer (2) units is further preferably 55/45 to 77/23, and the amount of monomer units other than the VdF and fluorine-containing monomer (2) units is further preferably 0 to 45 mol % in all of the monomer units. The monomers other than the VdF and fluorine-containing monomer (2) units are preferably the monomers listed above as the comonomers for VdF, that is, TFE, HFP, PMVE, perfluoroethyl vinyl ether (PEVE), PPVE, CTFE, trifluoroethylene, hexafluoroisobutene, vinyl fluoride, ethylene (Et), propylene (Pr), alkyl vinyl ether, monomers giving a cross-linkable group, and a reactive emulsifier. Preferable among these are PMVE, CTFE, HFP, and TFE.

If the other monomers other than the VdF and fluorine-containing monomer (2) is TFE, the TFE unit content is 0 to 10 mol %, preferably 0 to 9 mol %, and more preferably 0 to 8 mol %, each in 100 mol % of all the monomer units.

The TFE/Pr fluororubber is a fluorine-containing copolymer containing 45 to 70 mol % of TFE and 55 to 30 mol % of Pr. In addition to these two components, the rubber may further contain 0 to 40 mol % of a specific third component (e.g. PAVE).

In the Et/HFP fluororubber, the ratio of Et/HFP is preferably (35 to 80)/(65 to 20) (mol %), and more preferably (40 to 75)/(60 to 25) (mol %).

In the Et/HFP/TFE fluororubber, the ratio of Et/HFP/TFE is preferably (35 to 75)/(25 to 50)/(0 to 15) (mol %), and more preferably (45 to 75)/(25 to 45)/(0 to 10) (mol %).

Examples of the perfluoro fluororubber include a TFE/PAVE copolymer. The ratio of TFE/PAVE is preferably (50 to 90)/(50 to 10) (mol %), more preferably (50 to 80)/(50 to 20) (mol %), and further preferably (55 to 75)/(45 to 25) (mol %).

Examples of the PAVE in this case include PMVE and PPVE. Each of these may be used alone, or any of these may be used in combination.

The fluororubber (A) preferably has a number average molecular weight of 5,000 to 500,000, more preferably 10,000 to 500,000, and particularly preferably 20,000 to 500,000.

From the viewpoint of processability, the fluororubber (A) preferably has a Mooney viscosity at 100° C. of within a range of 20 to 200, and more preferably 30 to 180. The Mooney viscosity is measured in accordance with ASTM-D1646 and JIS K 6300.

The above-described non-perfluoro fluororubber and perfluoro fluororubber may be produced by a common method such as emulsion polymerization, suspension polymerization, or solution polymerization. In particular, a polymerization method using an iodine (bromine) compound, which is known as iodine (bromine) transfer polymerization, can provide a fluororubber having a narrow molecular weight distribution.

In order to provide a fluororubber composition having a low viscosity, for example, other species of fluororubbers may be blended with the fluororubber (A). Examples of other fluororubbers include low molecular weight liquid fluororubber (number average molecular weight: 1,000 or more), low molecular weight fluororubber having a number average molecular weight of about 10,000, and fluororubber having a number average molecular weight of about 100,000 to about 200,000.

The listed monomers in the above non-perfluoro fluororubber and perfluoro fluororubber are examples of the main monomers of the rubber, and the main monomers may be suitably copolymerized with monomers giving a cross-linkable group. The monomer giving a cross-linkable group may be any monomer which can provide a suitable cross-linkable group depending on a production method and cross-link system. Examples thereof include known polymerizable compounds and chain transfer agents having an iodine atom, bromine atom, carbon-carbon double bond, cyano group, carboxyl group, hydroxy group, amino group, ester group, and the like.

Preferable examples of the monomer giving a cross-linkable group include a compound represented by formula (3):

$$CY^1_2=CY^2Rf^2X^1 \quad (3)$$

wherein $Y^1$ and $Y^2$ each are a fluorine atom, hydrogen atom, or —$CH_3$; $Rf^2$ is a linear or branched fluoroalkylene group which may have one or more ether bonds and which may have one or more aromatic rings, and in which part or all of the hydrogen atoms are replaced by fluorine atoms; $X^1$ is an iodine atom or a bromine atom.

Specific examples thereof include: iodine-containing monomers and bromine-containing monomers represented by formula (4):

$$CY^1_2=CY^2Rf^3CHR^1—X^1 \quad (4)$$

wherein $Y^1$, $Y^2$, and $X^1$ each are the same as defined above; $Rf^3$ is a linear or branched fluoroalkylene group which may have one or more ether bonds and in which part or all of the hydrogen atoms are replaced by fluorine atoms, in other words, $Rf^3$ is a linear or branched fluorine-containing alkylene group in which part or all of the hydrogen atoms are replaced by fluorine atoms, a linear or branched fluorine-containing oxyalkylene group in which part or all of the hydrogen atoms are replaced by fluorine atoms, or linear or branched fluorine-containing polyoxyalkylene group in which part or all of the hydrogen atoms are replaced by fluorine atoms; $R^1$ is a hydrogen atom or a methyl group; and iodine-containing monomers and bromine-containing monomers represented by formulas (5) to (22):

$$CY^4_2=CY^4(CF_2)_n-X^1 \tag{5}$$

wherein $Y^4$s may be the same as or different from each other, and each of these is a hydrogen atom or a fluorine atom; n is an integer of 1 to 8, $$CF_2=CFCF_2Rf^4-X^1 \tag{6}$$

wherein
$R_f^4$ is $-(OCF_2)_n-$ or $-(OCF(CF_3))_n-$;
n is an integer of 0 to 5;

$$CF_2=CFCF_2(OCF(CF_3)CF_2)_m(OCH_2CF_2CF_2)_n\,OCH_2CF_2-X^1 \tag{7}$$

wherein m is an integer of 0 to 5; n is an integer of 0 to 5;

$$CF_2=CFCF_2(OCH_2CF_2CF_2)_m(OCF(CF_3)CF_2)_nOCF(CF_3)-X^1 \tag{8}$$

wherein m is an integer of 0 to 5; n is an integer of 0 to 5;

$$CF_2=CF(OCF_2CF(CF_3))_mO(CF_2)_n-X^1 \tag{9}$$

wherein m is an integer of 0 to 5; n is an integer of 1 to 8;

$$CF_2=CF(OCF_2CF(CF_3))_m-X^1 \tag{10}$$

wherein m is an integer of 1 to 5;

$$CF_2=CFOCF_2(CF(CF_3)OCF_2)_nCF(-X^1)CF_3 \tag{11}$$

wherein n is an integer of 1 to 4;

$$CF_2=CFO(CF_2)_nOCF(CF_3)-X^1 \tag{12}$$

wherein n is an integer of 2 to 5;

$$CF_2=CFO(CF_2)_n-(C_6H_4)-X^1 \tag{13}$$

wherein n is an integer of 1 to 6;

$$CF_2=CF(OCF_2CF(CF_3))_nOCF_2CF(CF_3)-X^1 \tag{14}$$

wherein n is an integer of 1 to 2;

$$CH_2=CFCF_2O(CF(CF_3)CF_2O)_nCF(CF_3)-X^1 \tag{15}$$

wherein n is an integer of 0 to 5;

$$CF_2=CFO(CF_2CF(CF_3)O)_m(CF_2)_n-X^1 \tag{16}$$

wherein m is an integer of 0 to 5; n is an integer of 1 to 3;

$$CH_2=CFCF_2OCF(CF_3)OCF(CF_3)-X^1 \tag{17}$$

$$CH_2=CFCF_2OCH_2CF_2-X^1 \tag{18}$$

$$CF_2=CFO(CF_2CF(CF_3)O)_mCF_2CF(CF_3)-X^1 \tag{19}$$

wherein m is an integer of 0 or greater;

$$CF_2=CFOCF(CF_3)CF_2O(CF_2)_n-X^1 \tag{20}$$

wherein n is an integer of 1 or greater;

$$CF_2=CFOCF_2OCF_2CF(CF_3)OCF_2-X^1 \tag{21); and}$$

$$CH_2=CH-(CF_2)_nX^1 \tag{22}$$

wherein n is an integer of 2 to 8.

In formulas (5) to (22), $X^1$ is the same as defined above. Each of these may be used alone, or any of these may be used in combination.

The iodine-containing monomer or the bromine-containing monomer represented by formula (4) is preferably an iodine-containing fluorinated vinyl ether represented by formula (23):

$$I(CH_2CF_2CF_2O)_m(\overset{CF_3}{\underset{|}{C}}FCF_2O)_nCF=CF_2 \tag{23}$$

wherein m is an integer of 1 to 5; n is an integer of 0 to 3. More specific examples thereof include those represented as follows.

$$I\,CH_2CF_2CF_2OCF=CF_2,\ I\,(CH_2CF_2CF_2O)_2CF=CF_2,$$

$$I\,(CH_2CF_2CF_2O)_3CF=CF_2,\ I\,CH_2CF_2CF_2O\overset{CF_3}{\underset{|}{C}}FCF_2OCF=CF_2,$$

$$I\,CH_2CF_2CF_2O(\overset{CF_3}{\underset{|}{C}}FCF_2O)_2CF=CF_2$$

Preferable among these is $ICH_2CF_2CF_2OCF=CF_2$.

More specifically, preferable examples of the iodine-containing monomer and the bromine-containing monomer represented by formula (5) include $ICF_2CF_2CF=CH_2$ and $I(CF_2CF_2)_2CF=CH_2$.

More specifically, preferable examples of the iodine-containing monomer and the bromine-containing monomer represented by formula (9) include $I(CF_2CF_2)_2OCF=CF_2$.

More specifically, preferable examples of the iodine-containing monomer and the bromine-containing monomer represented by formula (22) include $CH_2=CHCF_2CF_2I$ and $I(CF_2CF_2)_2CH=CH_2$.

Further, a bisolefin compound represented by formula:

$$R^2R^3C=CR^4-Z-CR^5=CR^6R^7$$

wherein $R^2$, $R^3$, $R^4$, $R^5$, $R^6$, and $R^7$ may be the same as or different from each other, and each of these is H or a C1-C5 alkyl group; Z is a linear or branched C1-C18 alkylene group or cycloalkylene group which may have an oxygen atom and which is preferably at least partially fluorinated, or a (per)fluoropolyoxyalkylene group, is also preferable as a monomer giving a cross-linkable group. The term "(per)fluoropolyoxyalkylene group" herein means a fluoropolyoxyalkylene group or a perfluoropolyoxyalkylene group.

Z is preferably a C4-C12 (per)fluoroalkylene group; $R^2$, $R^3$, $R^4$, $R^5$, $R^6$, and $R^7$ each are preferably a hydrogen atom.

In the case that Z is a (per)fluoropolyoxyalkylene group, it is preferably a (per)fluoropolyoxyalkylene group represented by formula:

$$-(Q)_p-CF_2O-(CF_2CF_2O)_m-(CF_2O)_n-CF_2-(Q)_p-$$

wherein Q is a C1-C10 alkylene group or a C2-C10 oxyalkylene group; p is 0 or 1; m and n are integers which give an m/n ratio of 0.2 to 5 and a molecular weight of the (per)fluoropolyoxyalkylene group of 500 to 10,000, preferably 1,000 to 4,000. In this formula, Q is preferably selected from $-CH_2OCH_2-$ and $-CH_2-O-(CH_2CH_2O)_sCH_2-$ wherein s=1 to 3.

Preferable examples of the bisolefin include $CH_2=CH-(CF_2)_4-CH=CH_2$, $CH_2=CH-(CF_2)_6-CH=CH_2$, and those represented by formula:

$$CH_2=CH-Z^1-CH=CH_2$$

wherein $Z^1$ is $-CH_2OCH_2-CF_2O-(CF_2CF_2O)_m-(CF_2O)_n-CF_2-CH_2OCH_2-$, wherein m/n is 0.5.

Preferable among these is 3,3,4,4,5,5,6,6,7,7,8,8-dodecafluoro-1,9-decadiene represented as $CH_2=CH-(CF_2)_6-CH=CH_2$.

In the present invention, the carbon black (B) is a carbon black that provides the loss modulus E" in the above range, and preferably provides the storage modulus E' in the above range.

Examples of such a carbon black include furnace black, acetylene black, thermal black, channel black, and graphite. Specific examples thereof include SAF-HS($N_2SA$: 142 $m^2/g$, DBP: 130 ml/100 g), SAF ($N_2SA$: 142 $m^2/g$, DBP: 115 ml/100 g), N234 ($N_2SA$: 126 $m^2/g$, DBP: 125 ml/100 g), ISAF ($N_2SA$: 119 $m^2/g$, DBP: 114 ml/100 g), ISAF-LS ($N_2SA$: 106 $m^2/g$, DBP: 75 ml/100 g), ISAF-HS($N_2SA$: 99 $m^2/g$, DBP: 129 ml/100 g), N339 ($N_2SA$: 93 $m^2/g$, DBP: 119 ml/100 g), HAF-LS ($N_2SA$: 84 $m^2/g$, DBP: 75 ml/100 g), HAS-HS($N_2SA$: 82 $m^2/g$, DBP: 126 ml/100 g), HAF ($N_2SA$: 79 $m^2/g$, DBP: 101 ml/100 g), N351 ($N_2SA$: 74 $m^2/g$, DBP: 127 ml/100 g), LI-HAF ($N_2SA$: 74 $m^2/g$, DBP: 101 ml/100 g), MAF-HS($N_2SA$: 56 $m^2/g$, DBP: 158 ml/100 g), MAF ($N_2SA$: 49 $m^2/g$, DBP: 133 ml/100 g), FEF-HS ($N_2SA$: 42 $m^2/g$, DBP: 160 ml/100 g), FEF ($N_2SA$: 42 $m^2/g$, DBP: 115 ml/100 g), SRF-HS($N_2SA$: 32 $m^2/g$, DBP: 140 ml/100 g), SRF—HS($N_2SA$: 29 $m^2/g$, DBP: 152 ml/100 g), GPF ($N_2SA$: 27 $m^2/g$, DBP: 87 ml/100 g), SRF ($N_2SA$: 27 $m^2/g$, DBP: 68 ml/100 g), SRF-LS ($N_2SA$: 23 $m^2/g$, DBP: 51 ml/100 g), FT ($N_2SA$: 19 $m^2/g$, DBP: 42 ml/100 g), and MT ($N_2SA$: 8 $m^2/g$, DBP: 43 ml/100 g). Each of these carbon blacks may be used alone, or two or more of these may be used in combination.

Particularly preferable as the carbon black is a carbon black having a nitrogen adsorption specific surface area ($N_2SA$) of 5 to 180 $m^2/g$ and a dibutyl phthalate (DBP) oil absorption of 40 to 180 ml/100 g.

If the nitrogen adsorption specific surface area ($N_2SA$) is too small, the mechanical properties of rubber tend to be poor in the case that the carbon black is mixed into the rubber. From this viewpoint, the nitrogen adsorption specific surface area ($N_2SA$) is preferably 10 $m^2/g$ or larger, more preferably 20 $m^2/g$ or larger, further preferably 30 $m^2/g$ or larger, further more preferably 40 $m^2/g$ or larger, particularly preferably 80 $m^2/g$ or larger, and most preferably 100 $m^2/g$ or larger. The upper limit thereof is preferably 180 $m^2/g$, in terms of easy availability in general.

If the dibutyl phthalate (DBP) oil absorption is smaller than 40 ml/100 g, the mechanical properties of rubber tend to be poor in the case that the carbon black is mixed into the rubber. From this viewpoint, the DBP oil absorption is preferably 50 ml/100 g or higher, more preferably 60 ml/100 g or higher, further preferably 70 ml/100 g or higher, further more preferably 100 ml/100 g or higher, and particularly preferably 110 ml/100 g or higher. The upper limit thereof is preferably 175 ml/100 g, and further preferably 170 ml/100 g because of easy availability in general.

The amount of the carbon black (B) is preferably 5 to 50 parts by mass to 100 parts by mass of the fluororubber (A). Too large an amount of the carbon black (B) tends to cause poor mechanical properties of a cross-linked product and tends to make the cross-linked product too hard. In contrast, too small an amount of the carbon black (B) tends to cause poor mechanical properties. For good balance of physical properties, the amount thereof is preferably 6 parts by mass or more, more preferably 10 parts by mass or more, and further preferably 20 parts by mass or more, to 100 parts by mass of the fluororubber (A). For good balance of physical properties, the amount thereof is preferably 49 parts by mass or less and, in particular, more preferably 45 parts by mass or less.

In order to obtain the cross-linked fluororubber layer of the present invention, a fluororubber composition is suitably used which has a difference δG'(G'(1%)−G'(100%)) between the shear modulus G'(1%) at 1% dynamic strain and the shear modulus G'(100%) at 100% dynamic strain of 120 kPa or higher and 3,000 kPa or lower determined by a dynamic viscoelasticity test (measurement temperature: 100° C., measurement frequency: 1 Hz) with a rubber process analyzer (RPA) before cross-linked.

The difference δG' is used as a standard for evaluating the reinforcement of the rubber composition, and it is determined by a dynamic viscoelasticity test with a rubber process analyzer.

The fluororubber composition having a difference δG' in the range of 120 kPa or higher and 3,000 kPa or lower is advantageous for a normal state at room temperature, mechanical properties at high temperatures, and the like.

The difference δG' is preferably 150 or higher, and further preferably 160 or higher, for a normal state at room temperature, mechanical properties at high temperatures, and the like. In contrast, it is preferably 2,800 or lower, and further preferably 2,500 or lower, for a normal state at room temperature, hardness, viscosity upon extrusion molding, mechanical properties at high temperatures, and the like.

The fluororubber composition having a difference δG' of 120 kPa or higher and 3,000 kPa or lower may be prepared using a mixer or a roll mixer, for example.

More specifically, the following methods may be adopted; the method is not limited to these methods.

(1) A method in which predetermined amounts of a fluororubber (A) and a carbon black (B), and if necessary the below-mentioned organic amine compound and/or acid acceptor, are charged into an internal mixer, and then mixed at an average shear rate of a rotor of 50 to 1,000 (1/second), preferably 100 to 1,000 (1/second), and further preferably 200 to 1,000 (1/second) so that the highest mixing temperature Tm is 80° C. to 220° C. (preferably 120° C. to 200° C.) (in other words, mixing is preferably carried out under the condition that a mixed product has a highest temperature Tm of 80° C. to 220° C. while being mixed and being discharged. The same applies below). Examples of the internal mixer include a pressurizing kneader, Banbury mixer, single screw mixer, and twin screw mixer.

(2) A method in which predetermined amounts of a fluororubber (A) and a carbon black (B), and if necessary the below-mentioned organic amine compound and/or acid acceptor, are charged into a roll mixer, and then mixed under the conditions that the average shear rate of a rotor is 50 (1/second) or higher and the highest mixing temperature Tm is to be 80° C. to 220° C. (preferably, 120° C. to 200° C.)

The fluororubber compositions obtained by the above methods (1) and (2) are free from components such as a cross-linking agent (and/or a cross-linking aid (D)) and a cross-linking accelerator. Further, the mixing of the methods (1) or (2) may be performed multiple times. In the case of performing the mixing multiple times, the mixing conditions of the second and further subsequent mixing may be the same as those in the methods (1) and (2) except that the highest temperature Tm upon mixing is 140° C. or lower.

One example of the method for preparing a cross-linkable fluororubber composition used in the present invention is a method in which the fluororubber composition obtained in the method (1) or (2), or obtained by repeating the method (1) or (2) multiple times, is further blend-mixed with a cross-linking agent (C) (and/or a cross-linking aid (D)) and a cross-linking accelerator.

The cross-linking agent (C) (and/or the cross-linking aid (D)) and the cross-linking accelerator may be blend-mixed at the same time, or the cross-linking accelerator may be first blend-mixed and then the cross-linking agent (C) (and/or the cross-linking aid (D)) may be blend-mixed. The conditions for mixing the cross-linking agent (C) (and/or the cross-linking aid (D)) and the cross-linking accelerator may be the same as those in the methods (1) and (2) except that the highest mixing temperature Tm is 130° C. or lower.

Another example of the method for preparing a cross-linkable fluororubber composition is a method in which predetermined amounts of a fluororubber (A), carbon black (B), cross-linking agent (C) (and/or cross-linking aid (D)), and cross-linking accelerator are charged into a roll mixer in an appropriate order, and then mixed under the conditions that the average shear rate of a rotor is 50 (1/second) or higher and the highest mixing temperature Tm is 130° C. or lower.

In the case of the polyol cross-link system, the fluororubber (A), the cross-linking agent (C), and a cross-linking accelerator may be preliminarily mixed to prepare a uniform dispersion, and this uniform dispersion may be used. For example, the fluororubber (A), a polyol cross-linking agent, and a cross-linking accelerator are first mixed, and then a carbon black and the below-mentioned organic amine compound are mixed thereinto. The highest temperature Tm upon the mixing is 80 to 220° C. Finally, an acid acceptor is mixed therewith. The highest temperature Tm upon the mixing is 130° C. or lower. Upon mixing, a more preferable is one in which mixing is performed at an average shear rate of 50 (1/second) or higher.

The range of the difference δG' is preferably satisfied in the fluororubber composition before mixed with a cross-linking agent (C) and/or a cross-linking aid (D), and a cross-linking accelerator. Further, the difference δG' is also preferably within the above range even in the fluororubber composition containing a cross-linking agent (C) and/or a cross-linking aid (D), and a cross-linking accelerator.

In order to obtain a fluororubber layer having the aforementioned specific loss modulus E" and storage modulus E', the average shear rate is preferably 50 (1/second) or higher. An average shear rate of 50 (1/second) or higher provides desired normal state at room temperature and mechanical properties at high temperatures. The average shear rate is more preferably 100 (1/second) or higher, further preferably 200(1/second) or higher, and particularly preferably 300 (1/second) or higher. Also, the average shear rate is preferably 1000(1/second) or lower.

The average shear rate(1/second) is calculated by the following equation.

Average shear rate(1/second)=(π×D×R)/(60 seconds)×c)

wherein
D: rotor diameter or roll diameter (cm)
R: rotation rate (rpm)
c: tip clearance (cm, gap distance between rotor and casing or gap distance between rolls)

The cross-linking agent (C) and/or the cross-linking aid (D), and the cross-linking accelerator may be appropriately selected depending on the cross-link system, the type of the fluororubber (A) to be cross-linked (e.g. composition of copolymerization, presence of a cross-linkable group and the type thereof), the specific applications and the modes of a diaphragm to be used, the mixing conditions, and the like.

Examples of the cross-link system include a peroxide cross-link system, polyol cross-link system, polyamine cross-link system, oxazole cross-link system, thiazole cross-link system, imidazole cross-link system, and triazine cross-link system.

(Peroxide Cross-Link System)

In the case that cross-linking is performed by the peroxide cross-link system, the cross-linking site of the cross-linked product has a carbon-carbon bond; thus, the cross-linked product is superior in chemical resistance and steam resistance compared with the cross-linked product obtained in the polyol cross-link system of which the cross-linking site has a carbon-oxygen bond and that obtained in the polyamine cross-link system of which the cross-linking site has a carbon-nitrogen double bond.

The cross-linking agent (C) is preferably a cross-linking agent of the peroxide cross-link system. The cross-linking agent of the peroxide cross-link system may be any peroxide capable of easily generating a peroxy radical in the presence of heat or a redox system. Specific examples thereof include organic peroxides such as 1,1-bis(t-butylperoxy)-3,5,5-trimethylcyclohexane, 2,5-dimethylhexane-2,5-dihydroperoxide, di-t-butyl peroxide, t-butylcumyl peroxide, dicumyl peroxide, α,α-bis(t-butylperoxy)-p-diisopropylbenzene, α,α-bis(t-butylperoxy)-m-diisopropylbenzene, 2,5-dimethyl-2,5-di(t-butylperoxy)hexane, 2,5-dimethyl-2,5-di(t-butylperoxy)-hexyne-3, benzoyl peroxide, t-butylperoxybenzene, t-butylperoxybenzoate, t-butylperoxy maleic acid, and t-butylperoxyisopropyl carbonate. Preferable among these is 2,5-dimethyl-2,5-di(t-butylperoxy)hexane or 2,5-dimethyl-2,5-di(t-butylperoxy)-hexyne-3.

Further, in the peroxide cross-link system, it is preferable to use a cross-linking accelerator, in general. Examples of the cross-linking accelerator for peroxide cross-linking agents, especially organoperoxide cross-linking agents, include triallyl cyanurate, triallyl isocyanurate (TRIC), triacryl formal, triallyl trimellitate, N,N'-m-phenylene bismaleimide, dipropargyl terephthalate, diallyl phthalate, tetraallyl terephthalate amide, triallyl phosphate, bismaleimide, fluorinated triallyl isocyanurate (1,3,5-tris(2,3,3-trifluoro-2-propenyl)-1,3,5-triazine-2,4,6-trione), tris(diallylamine)-S-triazine, triallyl phosphite, N,N-diallylacrylamide, 1,6-divinyldodecafluorohexane, hexaallyl phosphoramide, N,N,N',N'-tetraallyl phthalamide, N,N,N',N'-tetraallyl malonamide, trivinyl isocyanurate, 2,4,6-trivinyl methyltrisiloxane, tri(5-norbornene-2-methylene)cyanurate, and triallyl phosphite. Preferable among these is triallyl isocyanurate (TRIC) from the viewpoints of its cross-linkability and physical properties of cross-linked products.

A perfluoro fluororubber and a non-perfluoro fluororubber having at least a TFE unit, a VdF unit, or a fluorine-containing monomer unit based on formula (1) may be suitably used as the fluororubber (A) for the peroxide cross-link system. Particularly preferable is at least one rubber selected from VdF rubbers and TFE/Pr rubbers.

From the viewpoint of cross-linkability, the fluororubber (A) suitable for the peroxide cross-link system is preferably a fluororubber having an iodine atom and/or a bromine atom as a cross-linking site. For good balance of physical properties, the amount of an iodine atom and/or a bromine atom is preferably 0.001 to 10% by mass, further preferably 0.01 to 5% by mass, and particularly preferably 0.1 to 3% by mass.

Generally, the amount of the peroxide cross-linking agent is preferably 0.01 to 10 parts by mass, more preferably 0.1 to 9 parts by mass, and particularly preferably 0.2 to 8 parts by mass, each to 100 parts by mass of the fluororubber (A). If the amount of the peroxide cross-linking agent is less than 0.01 parts by mass, cross-linking of the fluororubber (A) tends to insufficiently proceed. In contrast, if the amount thereof is more than 10 parts by mass, balance of physical properties tends to be poor.

Further, the amount of the cross-linking accelerator is generally 0.01 to 10 parts by mass, and preferably 0.1 to 9 parts by mass, relative to 100 parts by mass of the fluororubber (A). If the amount of the cross-linking accelerator is less than 0.01 parts by mass, cross-linking tends to take too long a time which may be impractical. If the amount thereof is more than 10 parts by mass, cross-linking tends to proceed too rapidly, as well as cause poor balance of physical properties.

(Polyol Cross-Link System)

The polyol cross-link system is suitably used because a cross-linked product obtained from the system has a carbon-oxygen bond at its cross-linking site and accordingly has a low compression set and excellent formability.

The polyol cross-linking agent may be a compound conventionally known as a cross-linking agent for fluororubber. Suitably used is a polyhydroxy compound, especially a polyhydroxyaromatic compound, for example, because it gives excellent heat resistance to a cross-linked product.

The polyhydroxyaromatic compound is not particularly limited. Examples thereof include 2,2-bis(4-hydroxyphenyl) propane (hereinafter referred to as bisphenol A), 2,2-bis(4-hydroxyphenyl)perfluoropropane (hereinafter referred to as bisphenol AF), resorcin, 1,3-dihydroxybenzene, 1,7-dihydroxynaphthalene, 2,7-dihydroxynaphthalene, 1,6-dihydroxynaphthalene, 4,4'-dihydroxydiphenyl, 4,4'-dihydroxystilbene, 2,6-dihydroxyanthracene, hydroquinone, catechol, 2,2-bis(4-hydroxyphenyl)butane (hereinafter referred to as bisphenol B), 4,4-bis(4-hydroxyphenyl)valerate, 2,2-bis(4-hydroxyphenyl)tetrafluorodichloropropane, 4,4'-dihydroxydiphenylsulfone, 4,4'-dihydroxydiphenylketone, tri(4-hydroxyphenyl)methane, 3,3',5,5'-tetrachlorobisphenol A, and 3,3',5,5'-tetrabromobisphenol A. These polyhydroxyaromatic compounds may be alkaline metal salts or alkaline earth metal salts; in the case of coagulating copolymers using an acid, it is preferable not to use the metal salts.

Of these compounds, polyhydroxy compounds are preferable because of a low compression set of a formed product to be obtained and excellent formability; polyhydroxyaromatic compounds are more preferable because of excellent heat resistance of a formed product to be obtained; and bisphenol AF is further preferable.

Further, in the polyol cross-link system, it is preferable to use a cross-linking accelerator, in general. A cross-linking accelerator accelerates generation of double bonds in molecules in defluorination reaction of the main chain of the fluororubber and addition of the polyhydroxy compound to the generated double bonds, so that the cross-linking reaction is accelerated.

A generally used cross-linking accelerator for the polyol cross-link system is an onium compound. The onium compound is not particularly limited. Examples thereof include ammonium compounds such as quaternary ammonium salts, phosphonium compounds such as quaternary phosphonium salts, oxonium compounds, sulfonium compounds, cyclic amines, and monofunctional amine compounds. Preferable among these are quaternary ammonium salts and quaternary phosphonium salts.

The quaternary ammonium salts are not particularly limited. Examples thereof include 8-methyl-1,8-diazabicyclo[5.4.0]-7-undecenium chloride, 8-methyl-1,8-diazabicyclo[5.4.0]-7-undecenium iodide, 8-methyl-1,8-diazabicyclo[5.4.0]-7-undecenium hydroxide, 8-methyl-1,8-diazabicyclo[5.4.0]-7-undecenium methylsulfate, 8-ethyl-1,8-diazabicyclo[5.4.0]-7-undecenium bromide, 8-propyl-1,8-diazabicyclo[5.4.0]-7-undecenium bromide, 8-dodecyl-1,8-diazabicyclo[5.4.0]-7-undecenium chloride, 8-dodecyl-1,8-diazabicyclo[5.4.0]-7-undecenium hydroxide, 8-eicosyl-1,8-diazabicyclo[5.4.0]-7-undecenium chloride, 8-tetracosyl-1,8-diazabicyclo[5.4.0]-7-undecenium chloride, 8-benzyl-1,8-diazabicyclo[5.4.0]-7-undecenium chloride (hereinafter referred to as DBU-B), 8-benzyl-1,8-diazabicyclo[5.4.0]-7-undecenium hydroxide, 8-phenethyl-1,8-diazabicyclo[5.4.0]-7-undecenium chloride, and 8-(3-phenylpropyl)-1,8-diazabicyclo[5.4.0]-7-undecenium chloride. Preferable among these is DBU-B because of its cross-linkability and physical properties of a cross-linked product.

The quaternary phosphonium salts are not particularly limited. Examples thereof include tetrabutylphosphonium chloride, benzyltriphenylphosphonium chloride (hereinafter referred to as BTPPC), benzyltrimethylphosphonium chloride, benzyltributylphosphonium chloride, tributylallylphosphonium chloride, tributyl-2-methoxypropylphosphonium chloride, and benzylphenyl(dimethylamino)phosphonium chloride. Preferable among these is benzyltriphenylphosphonium chloride (BTPPC) because of its cross-linkability and physical properties of a cross-linked product.

In addition, a molten salt of a quaternary ammonium salt or a quaternary phosphonium salt and bisphenol AF, or a chlorine-free cross-linking accelerator disclosed in JP 11-147891 A may be used as a cross-linking accelerator.

Any perfluoro fluororubber or non-perfluoro fluororubber having at least a TFE unit, a VdF unit, or a fluorine-containing monomer unit based on formula (1) may be suitably used as the fluororubber (A) for the polyol cross-link system. Particularly preferable is at least one rubber selected from VdF rubbers and TFE/Pr rubbers.

The amount of the polyol cross-linking agent is preferably 0.01 to 10 parts by mass, and more preferably 0.1 to 7 parts by mass, relative to 100 parts by mass of the fluororubber (A). If the amount of the polyol cross-linking agent is less than 0.01 parts by mass, cross-linking of the fluororubber (A) tends to insufficiently proceed. In contrast, if the amount thereof is more than 10 parts by mass, the balance of physical properties tends to be poor.

The amount of the cross-linking accelerator is preferably 0.01 to 8 parts by mass, and more preferably 0.02 to 5 parts by mass, to 100 parts by mass of the fluororubber (A). If the amount of the cross-linking accelerator is less than 0.01 parts by mass, cross-linking of the fluororubber (A) tends to insufficiently proceed. If the amount thereof is more than 8 parts by mass, the balance of physical properties tends to be poor.

(Polyamine Cross-Link System)

In the case of polyamine cross-linking, the cross-linked product has a carbon-nitrogen double bond at the cross-linking site and accordingly has excellent dynamic mechanical properties. However, the compression set tends to be high in comparison with the case of cross-linking using a polyol or peroxide cross-linking agent.

Examples of the polyamine cross-linking agent include polyamine compounds such as hexamethylenediamine carbamate, N,N'-dicinnamylidene-1,6-hexamethylenediamine, and 4,4'-bis(aminocyclohexyl)methane carbamate. Preferable among these is N,N'-dicinnamylidene-1,6-hexamethylenediamine.

Any perfluoro fluororubber or non-perfluoro fluororubber at least having a TFE unit, a VdF unit, or a fluorine-containing monomer unit based on formula (1) may be used as the fluororubber (A) suitable for the polyamine cross-link system. In particular, a VdF rubber or a TFE/Pr rubber is preferable.

The amount of the polyamine cross-linking agent is preferably 0.01 to 10 parts by mass, and more preferably 0.2 to 7 parts by mass, to 100 parts by mass of the fluororubber (A). If the amount of the polyamine cross-linking agent is less than 0.01 parts by mass, cross-linking of the fluororubber (A) tends to insufficiently proceed. In contrast, if the amount thereof is more than 10 parts by mass, the balance of physical properties tends to be poor.

(Oxazole Cross-Link System, Thiazole Cross-Link System, and Imidazole Cross-Link System)

The oxazole cross-link system, thiazole cross-link system, and imidazole cross-link system provide a cross-linked product with a low compression set and excellent heat resistance.

Examples of the cross-linking agent used in the oxazole cross-link system, thiazole cross-link system, and imidazole cross-link system include:

compounds having at least two cross-linkable reaction groups represented by formula (24):

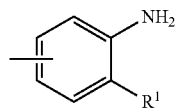

(24)

wherein $R^1$s may be the same as or different from each other and each are $-NH_2$, $-NHR^2$, $-OH$, or $-SH$; $R^2$ is a fluorine atom or a monovalent organic group;

compounds represented by formula (25):

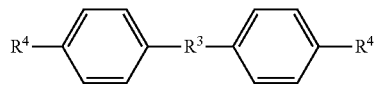

(25)

wherein $R^3$ is $-SO_2-$, $-O-$, $-CO-$, a C1-C6 alkylene group, a C1-C10 perfluoroalkylene group, or a single bond; and

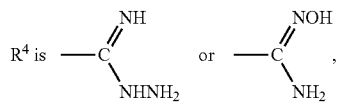

compounds represented by formula (26):

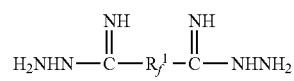

(26)

wherein $R_f^1$ is a C1-C10 perfluoroalkylene group; and
compounds represented by formula (27):

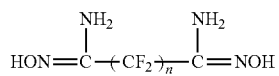

(27)

wherein n is an integer of 1 to 10.

Specific examples of the cross-linking agent include:
compounds each of which has two cross-linkable reaction groups represented by formula (24) and each of which is represented by formula (28):

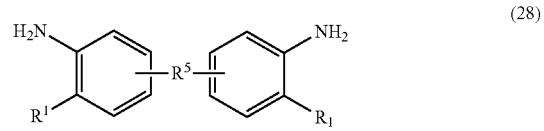

(28)

wherein $R^1$ is as defined above; $R^5$ is $-SO_2-$, $-O-$, $-CO-$, a C1-C6 alkylene group, a C1-C10 perfluoroalkylene group, a single bond, or a group represented by formula:

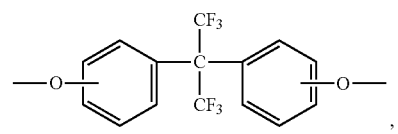

, 2,2-bis(3-amino-4-hydroxyphenyl)hexafluoropropane, 2,2-bis(3-amino-4-mercaptophenyl)hexafluoropropane, 2,2-bis(3,4-diaminophenyl)hexafluoropropane, and compounds represented by formula (29):

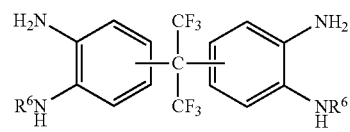

(29)

wherein $R^6$s are the same as or different from each other and each of these is a C1-C10 alkyl group; a fluorinated C1-C10 alkyl group; a phenyl group; a benzyl group; or a phenyl group or a benzyl group in which 1 to 5 hydrogen atoms are replaced by a fluorine atom and/or $-CF_3$.

Non-limitative specific examples thereof include bisaminophenol cross-linking agents such as 2,2-bis(3,4-diaminophenyl)hexafluoropropane, 2,2-bis[3-amino-4-(N-methylamino)phenyl]hexafluoropropane, 2,2-bis[3-amino-4-(N-ethylamino)phenyl]hexafluoropropane, 2,2-bis[3-amino-4-(N-propylamino)phenyl]hexafluoropropane, 2,2-bis[3-amino-4-(N-phenylamino)phenyl]hexafluoropropane, 2,2-bis[3-amino-4-(N-perfluorophenylamino)phenyl] hexafluoropropane, and 2,2-bis[3-amino-4-(N-benzylamino)phenyl]hexafluoropropane.

Further preferable among the above cross-linking agents are 2,2-bis(3-amino-4-hydroxyphenyl)hexafluoropropane (OH-AF), 2,2-bis[3-amino-4-(N-phenylamino)phenyl] hexafluoropropane(Nph-AF), and 2,2-bis(3,4-diaminophenyl)hexafluoropropane(TA-AF) because of excellent heat resistance and particularly good cross-linking reactivity.

In these oxazole cross-link system, thiazole cross-link system, and imidazole cross-link system, a cross-linking aid (D) may be used in combination for greatly increased cross-linking rate.

Examples of the cross-linking aid (D) combination-used in the oxazole cross-link system, thiazole cross-link system, and imidazole cross-link system include (D1) compounds generating ammonia at 40° C. to 330° C. and (D2) particulate inorganic nitride.

(D1) Compounds Generating Ammonia at 40° C. to 330° C. (Ammonia-Generating Compounds)

The ammonia-generating compound (D1) generates ammonia at cross-linking reaction temperature (40° C. to 330° C.). This ammonia cures the rubber as it forms a cross-linking structure, and also accelerates curing by a cross-linking agent. There are compounds which react with a slight amount of water to generate ammonia.

Preferable examples of the ammonia-generating compound (D1) include urea or derivatives thereof or ammonium salts. More preferable examples of the ammonia-generating compound (D1) include urea or ammonium salts. The ammonium salt may be an organic ammonium salt or may be an inorganic ammonium salt.

The derivatives of urea include urea, as well as urea derivatives such as biurea, thiourea, urea hydrochlorides, and biuret.

Examples of the organic ammonium salt include compounds disclosed in JP 9-111081 A, WO 00/09603, and WO 98/23675, such as ammonium salts of polyfluorocarboxylic acids e.g. ammonium perfluorohexanoate and ammonium perfluorooctanoate; ammonium salts of polyfluorosulfonic acids e.g. ammonium perfluorohexanesulfonate and ammonium perfluorooctanesulfonate; ammonium salts of polyfluoroalkyl group-containing phosphoric acids and phosphonic acids e.g. ammonium perfluorohexanephosphate and ammonium perfluorooctanephosphate; and ammonium salts of non-fluorocarboxylic acids and non-fluorosulfonic acids e.g. ammonium benzoate, ammonium adipate, and ammonium phthalate. Preferable among these are ammonium salts of fluorocarboxylic acids, fluorosulfonic acids, and fluorophosphoric acids from the viewpoint of dispersibility; from the viewpoint of low cost, preferable among these are ammonium salts of non-fluorocarboxylic acids, non-fluorosulfonic acids, and non-fluorophosphoric acids.

Examples of the inorganic ammonium salt include compounds disclosed in JP 9-111081 A, such as ammonium sulfate, ammonium carbonate, ammonium nitrate, and ammonium phosphate. Preferable among these is ammonium phosphate in consideration of cross-linking characteristics.

In addition, acetaldehyde ammonia, hexamethylenetetramine, formamidine, formamidine hydrochloride, formamidine acetate, t-butylcarbamate, benzylcarbamate, $HCF_2CF_2CH(CH_3)OCONH_2$, and phthalamide can be used.

Each of these ammonia-generating compounds (D1) may be used alone, or two or more of these may be used in combination.

(D2) Particulate Inorganic Nitride

The particulate inorganic nitride (D2) is not particularly limited. Examples thereof include silicon nitride ($Si_3N_4$), lithium nitride, titanium nitride, aluminum nitride, boron nitride, vanadium nitride, and zirconium nitride. Preferable among these is particulate silicon nitride because nano-size fine particles can be provided. Each of these particulate nitrides may be used alone, or two or more of these may be used in combination.

The particle diameter of the particulate inorganic nitride (D2) is not particularly limited; it is preferably 1000 nm or smaller, more preferably 300 nm or smaller, and further preferably 100 nm or smaller. The lower limit thereof is not particularly limited.

These particulate inorganic nitrides (D2) may be used in combination with an ammonia-generating compound (D1).

These oxazole cross-link system, thiazole cross-link system, and imidazole cross-link system are used for the following VdF fluororubber having a specific cross-linkable group and TFE/Pr fluororubber having a specific cross-linkable group.

(VdF Fluororubber Having Specific Cross-Linkable Group)

The VdF fluororubber having a specific cross-linkable group is preferably a VdF rubber which is a copolymer of VdF, at least one fluoroolefin selected from the group consisting of TFE, HFP, and fluoro(vinylether), and a monomer having a cyano group, carboxyl group, or alkoxycarbonyl group.

Here, it is important that the VdF units account for higher than 20 mol % of all the polymerization units in order to reduce weakness at low temperatures.

With respect to the fluoro(vinylether), at least one selected from the group consisting of the following monomers are preferable: those represented by formula (30):

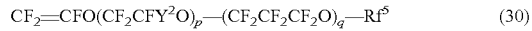

$CF_2=CFO(CF_2CFY^2O)_p-(CF_2CF_2CF_2O)_q-Rf^5$ (30)

wherein $Y^2$ is a fluorine atom or $-CF_3$; $Rf^5$ is a C1-C5 perfluoroalkyl group; p is an integer of 0 to 5; q is an integer of 0 to 5; and those represented by formula (31):

$CFX=CXOCF_2OR$ (31)

wherein X is F or H; R is a C1-C6 linear or branched fluoroalkyl group, a C5-C6 cyclic fluoroalkyl group, or a fluorooxyalkyl group; 1 or 2 atoms selected from H, Cl, Br, and I may be included therein.

Preferable among those represented by formulas (30) and (31) are PAVE. PMVE and PPVE are more preferable, and in particular PMVE is preferable.

Each of these may be used alone, or any of these may be used in combination.

The copolymerization ratio of the VdF and the specific fluoroolefin is not limited as long as the ratio of the VdF is higher than 20 mol %. A preferable VdF fluororubber contains 45 to 85 mol % of the VdF and 55 to 15 mol % of the specific fluoroolefin, and a more preferable VdF fluororubber contains 50 to 80 mol % of the VdF and 50 to 20 mol % of the specific fluoroolefin.

Specifically, the combination of the VdF and the specific fluoroolefin is preferably at least one copolymer selected from the group consisting of a VdF/HFP copolymer, VdF/HFP/TFE copolymer, VdF/PAVE copolymer, VdF/PAVE/TFE copolymer, VdF/HFP/PAVE copolymer, and VdF/HFP/TFE/PAVE copolymer.

In the VdF/HFP copolymer, the VdF/HFP ratio is preferably (45 to 85)/(55 to 15) (mol %), more preferably (50 to 80)/(50 to 20) (mol %), and further preferably (60 to 80)/(40 to 20) (mol %).

The ratio is also preferably (48 to 85)/(52 to 15) (mol %), more preferably (50 to 78)/(50 to 22) (mol %), and further preferably (55 to 77)/(45 to 23) (mol %).

In the VdF/PAVE copolymer, the VdF/PAVE ratio is preferably (65 to 90)/(35 to 10)(mol %).

The ratio is also preferably (48 to 85)/(52 to 15) (mol %), more preferably (50 to 78)/(50 to 22) (mol %), and further preferably (55 to 77)/(45 to 23) (mol %).

In the VdF/HFP/TFE copolymer, the VdF/HFP/TFE ratio is preferably (48 to 85)/(52 to 15)/(1 to 10) (mol %), more preferably (50 to 78)/(50 to 22)/(1 to 9) (mol %), and further preferably (55 to 77)/(45 to 23)/(1 to 8) (mol %).

In the VdF/PAVE/TFE copolymer, the VdF/PAVE/TFE ratio is preferably (40 to 80)/(15 to 35)/(3 to 40) (mol %).

The ratio is also preferably (48 to 85)/(52 to 15)/(1 to 10) (mol %), more preferably (50 to 78)/(50 to 22)/(1 to 9) (mol %), and further preferably (55 to 77)/(45 to 23)/(1 to 8) (mol %).

In the VdF/HFP/PAVE copolymer, the VdF/HFP/PAVE ratio is preferably (65 to 90)/(3 to 25)/(3 to 25) (mol %).

The ratio is also preferably (48 to 85)/(15 to 52)/(1 to 25) (mol %), more preferably (50 to 78)/(22 to 50)/(1 to 20) (mol %) and further preferably (55 to 77)/(45 to 23)/(1 to 15) (mol %).

In the VdF/HFP/TFE/PAVE copolymer, the VdF/HFP/TFE/PAVE ratio is preferably (40 to 90)/(0 to 25)/(0 to 40)/(3 to 35), and more preferably (40 to 80)/(3 to 25)/(3 to 40)/(3 to 25) (mol %).

The ratio is also preferably (48 to 85)/(15 to 52)/(1 to 10)/(1 to 25) (mol %), more preferably (50 to 78)/(22 to 50)/(1 to 9)/(1 to 20) (mol %), and further preferably (55 to 77)/(23 to 45)/(1 to 8)/(1 to 15) (mol %).

The amount of the monomer having a cyano group, carboxyl group, or alkoxycarbonyl group is preferably 0.1 to 5 mol %, and more preferably 0.3 to 3 mol %, relative to the total amount of the VdF and the specific fluoroolefin for good cross-linking characteristics and heat resistance.

Examples of the monomer having a cyano group, carboxyl group, or alkoxycarbonyl group include monomers represented by formulas (32) to (35):

$$CY^1_2=CY^1(CF_2)_n—X^1 \quad (32)$$

wherein $Y^1$ is a hydrogen atom or a fluorine atom; n is an integer of 1 to 8;

$$CF_2=CFCF_2Rf^6—X^1 \quad (33)$$

wherein $Rf^6$ is $—(OCF_2)_n—$ or $—(OCF(CF_3))_n—$; n is an integer of 0 to 5;

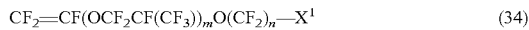

$$CF_2=CF(OCF_2CF(CF_3))_mO(CF_2)_n—X^1 \quad (34)$$

wherein m is an integer of 0 to 5; n is an integer of 1 to 8;

$$CF_2=CF(OCF_2CF(CF_3))_m—X^1 \quad (35)$$

wherein m is an integer of 1 to 5;
in formulas (32) to (35), $X^1$ is a cyano group (—CN group), carboxyl group (—COOH group), or alkoxycarbonyl group (—COOR group, R is an optionally fluorinated C1-C10 alkyl group). Each of these may be used alone, or any of these may be used in combination.

The VdF fluororubber having these specific cross-linkable groups may be produced by a common method.

These cross-linkable groups may be introduced by the method disclosed in WO 00/05959.

The VdF fluororubber having a specific cross-linkable group preferably has a Mooney viscosity ($ML_{1+10}(121°$ C.)) of 5 to 140, more preferably 5 to 120, and particularly preferably 5 to 100, for good processability.

(TFE/Pr Fluororubber Having Specific Cross-Linkable Group)

The TFE/Pr fluororubber having a specific cross-linkable group is a non-perfluoro fluororubber having 40 to 70 mol % of TFE units, 30 to 60 mol % of Pr units, and monomer units having cyano groups, carboxyl groups, or alkoxycarbonyl groups.

The rubber may contain 0 to 15 mol % of VdF units and/or 0 to 15 mol % of PAVE units to the total of the TFE units and the Pr units if necessary.

The amount of the TFE units is 40 to 70 mol %, and preferably 50 to 65 mol %; the TFE units in such an amount provide elastomeric properties with Pr units.

The amount of the Pr units is 30 to 60 mol %, and preferably 35 to 50 mol %; the Pr units in such an amount provide elastomeric properties with TFE units.

With respect to the monomers having a cyano group, carboxyl group, or alkoxycarbonyl group, the monomers mentioned as preferable for the VdF rubber having a specific cross-linkable group can be also used for the TFE/Pr fluororubber having a specific cross-linkable group.

The amount of the VdF units or PAVE units, which are not essential units, is preferably up to 15 mol %, and further preferably up to 10 mol %, to the total amounts of the TFE units and the Pr units. A larger amount of the former units causes poor amine resistance, while a larger amount of the latter units causes high cost.

The TFE/Pr fluororubber having a specific cross-linkable group generally has a Mooney viscosity ($ML_{1+10}(121°$ C.)) of 5 to 100. A Mooney viscosity of less than 5 causes poor cross-linkability, so that a cross-linked rubber tends to have insufficient physical properties. A Mooney viscosity of higher than 100 causes poor fluidity, and thus tends to cause poor molding processability. The Mooney viscosity ($ML_{1+10}(121°$ C.)) is preferably 10 to 80.

The TFE/Pr fluororubber having a specific cross-linkable group may be produced by a common emulsion polymerization method, but the polymerization rate of TFE and Pr is relatively slow in this method. In the two-step polymerization (seed polymerization) method, for example, the rubber can be efficiently produced.

The amount of the oxazole, thiazole, or imidazole cross-linking agent is preferably 0.1 to 20 parts by mass, and more preferably 0.5 to 10 parts by mass, to 100 parts by mass of the specific fluororubber. If the amount of the cross-linking agent is less than 0.1 parts by mass, the mechanical strength, heat resistance, and chemical resistance tend not to be sufficient for practical use. In contrast, if the amount thereof is more than 20 parts by mass, cross-linking tends to take a long time and a cross-linked product tends to be hard, likely resulting in flexibility loss.

In the case of using a cross-linking aid (D) in combination in these oxazole cross-link system, thiazole cross-link system, and imidazole cross-link system, the amount of the cross-linking aid (D) is 0.01 to 10 parts by mass, preferably 0.02 to 5 parts by mass, and more preferably 0.05 to 3 parts by mass, to 100 parts by mass of the aforementioned specific fluororubber, in general.

(Triazine Cross-Link System)

The triazine cross-link system provides a cross-linked product which has a low compression set and excellent heat resistance. In the triazine cross-link system, only a cross-linking aid (D) that initiates cross-linking reaction is used.

Examples of the cross-linking aid (D) used in the triazine cross-link system include (D1) compounds generating ammonia at 40° C. to 330° C. and (D2) particulate inorganic nitrides which are capable of being used together with a cross-linking agent in the oxazole cross-link system, thiazole cross-link system, and imidazole cross-link system.

The target fluororubber of the triazine cross-link system is preferably a fluororubber at least one cross-linkable group of which is a cyano group among target fluororubbers of the oxazole cross-link system, thiazole cross-link system, and imidazole cross-link system.

The amount of the ammonia-generating compound (D1) may be appropriately adjusted depending on the amount of ammonia to be generated. In general, the amount thereof is 0.05 to 10 parts by mass, preferably 0.1 to 5 parts by mass, and more preferably 0.2 to 3 parts by mass, to 100 parts by mass of the cyano group-containing fluororubber. Too small an amount of the ammonia-generating compound tends to cause a low cross-linking density, so that the heat resistance and chemical resistance tend to be insufficient for practical use. In contrast, too large an amount thereof may cause scorch, so that the storage stability tends to be poor.

The amount of the particulate inorganic nitride (D2) is generally 0.1 to 20 parts by mass, preferably 0.2 to 5 parts by mass, and more preferably 0.2 to 1 parts by mass, each to 100 parts by mass of the cyano group-containing fluororubber. If the amount of the particulate inorganic nitride (D2) is less than 0.1 parts by mass, the cross-linking density tends to be low, so that the heat resistance and chemical resistance tend to be insufficient for practical use. If the amount thereof is more than 20 parts by mass, scorch may occur, so that the storage stability tends to be poor.

In the present invention, the cross-link system is preferably the peroxide cross-link system, polyol cross-link system, oxazole cross-link system, thiazole cross-link system, imidazole cross-link system, or triazine cross-link system. More preferable is the peroxide cross-link system, oxazole cross-link system, thiazole cross-link system, imidazole cross-link system, or triazine cross-link system. In the respective cross-link systems, it is preferable to use a suitable cross-linking agent (C) or cross-linking aid (D).

If necessary, the fluororubber composition of the present invention may further contain common additives for rubber such as filler, processing aid, plasticizer, colorant, tackifier, adhesion promoter, acid acceptor, pigment, flame retardant, lubricant, photo stabilizer, weather-resistant stabilizer, antistatic agent, ultraviolet absorber, antioxidant, release agent, foaming agent, perfume, oil, and softener, and other polymers such as polyethylene, polypropylene, polyamide, polyester, and polyurethane to the extent that the effects of the present invention are not deteriorated.

Examples of the filler include: metal oxides such as calcium oxide, titanium oxide, aluminum oxide, and magnesium oxide; metal hydroxides such as magnesium hydroxide, aluminum hydroxide, and calcium hydroxide; carbonates such as magnesium carbonate, aluminum carbonate, calcium carbonate, and barium carbonate; silicates such as magnesium silicate, calcium silicate, sodium silicate, and aluminum silicate; sulfates such as aluminum sulfate, calcium sulfate, and barium sulfate; synthesized hydrotalcite; metal sulfides such as molybdenum disulfide, iron sulfide, and copper sulfide; diatomaceous earth, asbestos, lithopone (zinc sulfide/barium sulfide), graphite, carbon fluoride, calcium fluoride, coke, fine particulate quartz, talc, powdery mica, Wollastonite, fibrous carbon, fibrous aramid, various whiskers, fibrous glass, organic reinforcing agent, organic filler, polytetrafluoroethylene, mica, silica, celite, and clay. Further, examples of the acid acceptor include calcium oxide, magnesium oxide, lead oxide, zinc oxide, magnesium hydroxide, calcium hydroxide, aluminum hydroxide, and hydrotalcite. Each of these may be used alone, or two or more of these may be appropriately used in combination. These may be added at any step in the aforementioned mixing method; they are preferably added upon mixing the fluororubber and the carbon black with an internal mixer or a roll mixer.

Examples of the processing aid include: higher fatty acids such as stearic acid, oleic acid, palmitic acid, and lauric acid; higher fatty acid salts such as sodium stearate and zinc stearate; higher fatty acid amides such as stearamide and oleamide; higher fatty acid esters such as ethyl oleate; petroleum wax such as carnauba wax and ceresin wax; polyglycols such as ethylene glycol, glycerine, and diethylene glycol; aliphatic hydrocarbons such as vaseline and paraffin; silicone oils, silicone polymers, low molecular weight polyethylene, phthalic acid esters, phosphoric acid esters, rosin, (halogenated) dialkylamines, surfactants, sulfone compounds, fluorine aids, and organic amine compounds.

In particular, the higher fatty acid, the organic amine compound and the acid acceptor are preferable additives because, in the case that they are blended upon mixing the fluororubber (A) and the carbon black (B) with an internal mixer or a roll mixer, they improve reinforceability. The highest mixing temperature is preferably 80° C. to 220° C.

Particularly preferable as the higher fatty acid is stearic acid. The amount of the higher fatty acid is preferably 0.01 to 5 parts by mass to 100 parts by mass of the fluororubber (A). Too large an amount of the higher fatty acid tends to cause difficulty in mixing, while too small an amount thereof tends to cause poor reinforceability. The amount with respect to 100 parts by mass of the fluororubber (A) is further preferably 0.1 parts by mass or more from the viewpoint of reinforceability and 4 parts by mass or less from the viewpoints of reinforceability and easy mixing.

Preferable examples of the organic amine compound include primary amines represented as $R^1NH_2$, secondary amines represented as $R^1R^2NH$, and tertiary amines represented as $R^1R^2R^3N$. $R^1$, $R^2$, and $R^3$ may be the same as or different from each other and each of these is preferably a C1-C50 alkyl group. The alkyl group may have a benzene ring as a functional group, or may have a double bond and/or conjugated double bond. Further, the alkyl group may have a linear shape or a branched shape.

Examples of the primary amine include coconut amine, octyl amine, lauryl amine, stearyl amine, oleyl amine, beef tallow amine, 17-phenyl-heptadecylamine, octadeca-7,11-dienylamine, octadeca-7,9-dienylamine, octadec-9-enylamine, and 7-methyl-octadec-7-enylamine. Examples of the secondary amine include distearylamine. Examples of the tertiary amine include dimethyloctylamine, dimethyldecylamine, dimethyllaurylamine, dimethylmyristylamine, dimethylpalmitylamine, dimethylstearylamine, and dimethylbehenylamine. Particularly preferable are amines, especially primary amines, having about 20 carbon atoms because they are easily available and they improve reinforceability.

The amount of the organic amine compound is preferably 0.01 to 5 parts by mass to 100 parts by mass of the fluororubber (A). Too large an amount of the organic amine compound tends to cause difficulty in mixing, while too small an amount thereof tends to cause poor reinforceability. The amount with respect to 100 parts by mass of the fluororubber (A) is further preferably 0.1 parts by mass or more from the viewpoint of reinforceability and 4 parts by mass or less from the viewpoints of reinforceability and easy mixing.

The acid acceptor is preferably a metal hydroxide such as calcium hydroxide; a metal oxide such as magnesium oxide or zinc oxide; or hydrotalcite among the aforementioned examples from the viewpoint of reinforceability, for example, and it is particularly preferably zinc oxide.

The amount of the acid acceptor is preferably 0.01 to 10 parts by mass to 100 parts by mass of the fluororubber (A). Too large an amount of the acid acceptor tends to cause poor physical properties, while too small an amount thereof tends to cause poor reinforceability. The amount with respect to 100 parts by mass of the fluororubber (A) is further preferably 0.1 parts by mass or more from the viewpoint of reinforceability, while it is preferably 8 parts by mass or less, and more preferably 5 parts by mass or less, from the viewpoints of physical properties and easy mixing.

The diaphragm of the present invention preferably comprises a cross-linked fluororubber layer obtained by cross-linking a fluororubber composition containing a cross-linking agent (C) and/or a cross-linking aid (D).

In the present invention, the fluororubber composition may be cross-linked and molded by an appropriately selected method; a common method of cross-linking and molding for a diaphragm may be used. For example, an un-cross-linked fluororubber is cross-linked by extrusion process (calender molding); or, an un-cross-linked fluororubber is pressurized and cross-linked in a mold to provide a diaphragm. A cross-linked product obtained by the aforementioned method may be further cross-linked in an oven such as a hot-air circulation electric oven (secondarily cure).

Also, a molding method according to which a fluororubber composition is pressed against a mold by vulcanization bladder can be used (JP 2010-058396 A).

The obtained cross-linked fluororubber layer has a loss modulus E" of 400 kPa or higher and 6000 kPa or lower determined by a dynamic viscoelasticity test (for example, mode: tensile, chuck distance: 20 mm, measurement temperature: 160° C., tensile strain: 1%, static tension under a constant static load condition for measuring strain distribution: 157 cN, and frequency: 10 Hz).

If the loss modulus E" is within the above range, the rubber layer has particularly excellent normal state at room temperature and mechanical properties at high temperatures. The lower limit thereof is preferably 420 kPa, more preferably 430 kPa, further preferably 450 kPa, further more preferably 500 kPa, particularly preferably 1,000 kPa, and most preferably 1,500 kPa. The upper limit thereof is preferably 5,900 kPa, more preferably 5,800 kPa, further more preferably 5,000 kPa, and particularly preferably 3,000 kPa.

For improved mechanical properties at high temperatures, the cross-linked fluororubber layer further preferably has a storage modulus E' of 1,500 kPa or higher and 20,000 kPa or lower determined by a dynamic viscoelasticity test (for example, measurement mode: tensile, chuck distance: 20 mm, measurement temperature: 160° C., tensile strain: 1%, static tension under a constant static load condition for measuring strain distribution: 157 cN, and frequency: 10 Hz). The lower limit thereof is preferably 1,600 kPa, more preferably 1,700 kPa, further preferably 2,500 kPa, and particularly preferably 5,000 kPa, while the upper limit thereof is preferably 19,000 kPa, more preferably 18,000 kPa, and particularly preferably 15,000 kPa.

The cross-linked fluororubber layer preferably has an elongation at break at 160° C. of 100 to 700%, more preferably 120% or higher, further preferably 140% or higher, and particularly preferably 150% or higher, while preferably 650% or lower, and particularly preferably 600% or lower, because such a rubber layer is suitably used under high-temperature conditions.

The cross-linked fluororubber layer preferably has a tensile strength at break at 160° C. of 1.0 to 20 MPa, further preferably 1.3 MPa or higher, more preferably 1.5 MPa or higher, and particularly preferably 1.8 MPa or higher, while preferably 18 MPa or lower, more preferably 15 MPa or lower, and particularly preferably 12 MPa or lower, because such a rubber layer is suitably used under high-temperature conditions. The tensile strength at break and the elongation at break are measured using a #6 dumbbell in accordance with JIS-K 6251.

The cross-linked fluororubber layer preferably has a tear strength at 160° C. of 1.0 to 30 kN/m, further preferably 2.0 kN/m or higher, and particularly preferably 3.0 kN/m or higher, while preferably 29 kN/m or lower, and particularly preferably 28 kN/m or lower, because such a rubber layer is suitably used under high-temperature conditions.

The cross-linked fluororubber layer preferably has an elongation at break at 200° C. of 90 to 700%, more preferably 100% or higher, further preferably 120% or higher, and particularly preferably 130% or higher, while more preferably 650% or lower, and particularly preferably 600% or lower, because such a rubber layer is suitably used under high-temperature conditions.

The cross-linked fluororubber layer preferably has a tensile strength at break at 200° C. of 1.0 to 20 MPa, more preferably 1.2 MPa or higher, further preferably 1.4 MPa, and particularly preferably 1.5 MPa or higher, while preferably 18 MPa or lower, more preferably 15 MPa or lower, and particularly preferably 12 MPa or lower, because such a rubber layer is suitably used under high-temperature conditions.

The cross-linked fluororubber layer preferably has a tear strength at 200° C. of 1.0 to 30 kN/m, more preferably 1.5 kN/m or higher, and further preferably 2.0 kN/m or higher, while preferably 25 kN/m or lower, and particularly preferably 20 kN/m or lower, because such a rubber layer is suitably used under high-temperature conditions.

The cross-linked fluororubber layer preferably has an elongation at break at 230° C. of 80 to 700%, more preferably 90% or higher, and further preferably 100% or higher, and particularly preferably 110% or higher, while more preferably 650% or lower, and particularly preferably 600% or lower, because such a rubber layer is suitably used under high-temperature conditions.

The cross-linked fluororubber layer preferably has a tensile strength at break at 230° C. of 1.0 to 20 MPa, more preferably 1.1 MPa or higher, more preferably 1.2 MPa or higher, and particularly preferably 1.3 MPa or higher, while preferably 18 MPa or lower, more preferably 15 MPa or lower, and particularly preferably 12 MPa or lower, because such a rubber layer is suitably used under high-temperature conditions.

The cross-linked fluororubber layer preferably has a tear strength at 230° C. of 1.0 to 30 kN/m, more preferably 1.2 kN/m or higher, and further preferably 1.5 kN/m or higher, while preferably 25 kN/m or lower, and particularly preferably 15 kN/m or lower, because such a rubber layer is suitably used under high-temperature conditions.

The diaphragm of the present invention may be a monolayer diaphragm consisting of the cross-linked fluororubber layer obtained by cross-linking the fluororubber composition, or may be a multilayer diaphragm having a laminated structure with other layers. The diaphragm may contain a woven fabric or a knitted fabric for reinforcement; the woven or knitted fabric may be sandwiched between two cross-linked fluororubber layers, or may be sandwiched between a cross-linked layer and another layer. Examples of the woven fabric include a common plain-woven fabric.

Since the diaphragm of the present invention comprises a fluororubber, it is excellent in heat-aging resistance, chemical resistance, and oil resistance; further, owing to the aforementioned features, the diaphragm is excellent also in mechanical properties at high temperatures.

The present invention includes a use of the fluororubber cross-linked product as a diaphragm.

Examples of the monolayer diaphragms include those for car engines, specifically those used in the fuel system such as diaphragms for fuel pumps, diaphragms for carburetors, diaphragms for pressure regulators, diaphragms for pulsation dampers, diaphragms for ORVR, diaphragms for canisters, and diaphragms for auto fuel cocks; those used in the exhaust system such as diaphragms for waste gates, diaphragms for actuators, and diaphragms for EGR; those used in the braking system such as diaphragms for air braking; those used in the drive system such as diaphragms for oil pressure; and those used in the ignition system such as diaphragm for distributors. Examples of the diaphragms other than those for car engines include diaphragms for general pumps, diaphragms for valves, diaphragms for filter press, diaphragms for blower, diaphragms for air conditioners, diaphragms for control equipments, diaphragms for water supply, diaphragms for pumps transferring hot water used for hot-water supply and the like, diaphragms for high-temperature steam, diaphragms for semiconductor devices (for example, diaphragms for transferring chemicals used in a manufacturing process), diaphragms for food-processing devices, diaphragms for liquid storage tanks, diaphragms for pressure switches, diaphragms used oil exploration and oil drilling (for example, diaphragms for lubricant oil supply, such as oil drill bits), diaphragms for gas appliances such as instantaneous gas water heaters and gas meters, diaphragms for accumulators, and diaphragms for air springs such as suspensions, diaphragms for screw feeders for ships and boats, and diaphragms for medical artificial hearts.

Examples of the multilayer diaphragms also include those for car engines, specifically those used in the fuel system such as diaphragms for fuel pumps, diaphragms for carburetors, diaphragms for pressure regulators, diaphragms for pulsation dampers, diaphragms for ORVR, diaphragms for canisters, and diaphragms for auto fuel cocks; those used in the exhaust system such as diaphragms for waste gates, diaphragms for actuators, and diaphragms for EGR; those used in the braking system such as diaphragms for air braking; those used in the drive system such as diaphragms for oil pressure; and those used in the ignition system such as diaphragm for distributors. Examples of the diaphragms other than those for car engines include diaphragms for general pumps, diaphragms for valves, diaphragms for filter press, diaphragms for blower, diaphragms for air conditioners, diaphragms for control equipments, diaphragms for water supply, diaphragms for pumps transferring hot water used for hot-water supply and the like, diaphragms for high-temperature steam, diaphragms for semiconductor devices (for example, diaphragms for transferring chemicals used in a manufacturing process), diaphragms for food-processing devices, diaphragms for liquid storage tanks, diaphragms for pressure switches, diaphragms used oil exploration and oil drilling (for example, diaphragms for lubricant oil supply, such as oil drill bits), diaphragms for gas appliances such as instantaneous gas water heaters and gas meters, diaphragms for accumulators, and diaphragms for air springs such as suspensions, diaphragms for screw feeders for ships and boats, and diaphragms for medical artificial hearts.

The diaphragm of the present invention satisfies the required characteristics at high levels using the cross-linked fluororubber composition as a monolayer or multilayer rubber layer, and thus is a diaphragm which has excellent properties. The shape of the diaphragm depends on what it is used for.

In a multilayer diaphragm, layers made of other materials may be layers made of other rubbers, thermoplastic resin layers, fiber-reinforced layers, and metal foil layers, for example.

In the case that chemical resistance and flexibility are particularly required, the other rubbers preferably include at least one selected from the group consisting of acrylonitrile-butadiene rubber and hydrogenated rubber thereof, rubber blend of acrylonitrile-butadiene rubber and polyvinyl chloride, fluororubber, epichlorohydrin rubber, EPDM, and acrylic rubber. They more preferably include at least one selected from the group consisting of acrylonitrile-butadiene rubber and hydrogenated rubber thereof, rubber blend of acrylonitrile-butadiene rubber and polyvinyl chloride, fluororubber, and epichlorohydrin rubber.

Further, the thermoplastic resin is preferably a thermoplastic resin comprising at least one selected from the group consisting of fluorine resin, polyamide resin, polyolefin resin, polyester resin, polyvinyl alcohol resin, polyvinyl chloride resin, and polyphenylene sulfide resin. The thermoplastic resin is more preferably a thermoplastic resin comprising at least one selected from the group consisting of fluorine resin, polyamide resin, polyvinyl alcohol resin, and polyphenylene sulfide resin.

In the case of manufacturing a multilayer diaphragm, surface treatment may be optionally performed. The surface treatment is not particularly limited as long as it allows bonding. Examples thereof include discharging treatment such as plasma discharge and corona discharge, and wet treatment such as treatment with a metallic sodium/naphthalene solution. Further, priming is suitable as surface treatment. Priming can be performed in accordance with a common method. In the case of priming, the surface of a fluororubber which is not surface-treated may be treated; it is more effective to perform priming after prior treatment such as plasma discharge, corona discharge, or treatment with a metallic sodium/naphthalene solution.

The diaphragm of the present invention may be suitably used in the following fields.

Examples of the diaphragms for car engines include those for the fuel system, exhaust system, braking system, drive system, and ignition system, which require heat resistance, oxidation resistance, fuel resistance, and low gas permeability.

Examples of the diaphragms used in the fuel system of a vehicle engine include diaphragms for fuel pumps, diaphragms for carburetors, diaphragms for pressure regulators, diaphragms for pulsation dampers, diaphragms for ORVR, diaphragms for canisters, and diaphragms for auto fuel cocks.

Examples of the diaphragms used in the exhaust system of a vehicle engine include diaphragms for waste gates, diaphragms for actuators, and diaphragms for EGR.

Examples of the diaphragms used in the braking system of a vehicle engine include diaphragms for air braking.

Examples of the diaphragms used in the drive system of a vehicle engine include diaphragms for oil pressure.

Examples of the diaphragms used in the ignition system of a vehicle engine include diaphragms for distributors.

Examples of the diaphragms other than those for car engines includes diaphragms for general pumps, diaphragms for valves, diaphragms for filter press, diaphragms for blower, diaphragms for air conditioners, diaphragms for control equipments, diaphragms for water supply, diaphragms for pumps transferring hot water used for hot-water supply and the like, diaphragms for high-temperature steam, diaphragms for semiconductor devices (for example, diaphragms for transferring chemicals used in a manufacturing process), diaphragms for food-processing devices, diaphragms for liquid storage tanks, diaphragms for pressure switches, diaphragms used for oil exploration and oil drilling (for example, diaphragms for lubricant oil supply, such as oil drill bits), diaphragms for gas appliances such as instantaneous gas water heaters and gas meters, diaphragms for accumulators, and diaphragms for air springs such as suspensions, diaphragms for screw feeders for ships and boats, and diaphragms for medical artificial hearts, which need to have heat resistance, oil resistance, chemical resistance, steam resistance, and low gas permeability.

EXAMPLES

The present invention will be described referring to, but not limited to, examples.
Measurement methods of physical properties adopted in the present invention are as follows.
(1) Dynamic Viscoelasticity Test 1 (Loss Modulus E" and Storage Modulus E')
(Measurement Device)
Dynamic viscoelasticity measurement device DVA-220 (IT Keisoku Seigyo K.K.)
(Measurement Conditions)
Strain distribution is measured under the following conditions, and then the loss modulus E" and the storage modulus E' at 1% tensile strain are calculated.
Specimen: cross-linked rubber cuboid having a size of 3 mm in width×2 mm in thickness
Measurement mode: tensile
Chuck distance: 20 mm
Measurement temperature: 160° C.
Static tension under a constant static load condition for measuring strain distribution: 157 cN
Frequency: 10 Hz
(2) Dynamic Viscoelasticity Test 2 (Shear Modulus G')
(Measurement Device)
Rubber process analyzer (model: RPA2000, ALPHA TECHNOLOGY Co., LTD.)
(Measurement Conditions)
Strain distribution is measured at 100° C. and 1 Hz, whereby the shear modulus G' is determined. At this time, G' is measured for the respective dynamic strains 1% and 100%, and thereby δG' (G'(1%)−G'(100%)) is calculated.
(3) Tensile Strength at Break and Elongation at Break
The tensile strength at break and elongation at break are measured using RTA-1T (ORIENTEC Co., LTD.), AG-I (SHIMADZU Corp.), and a dumbbell #6 in accordance with JIS-K 6251. The measurement temperatures are 25° C., 160° C., 200° C., and 230° C.
(4) Mooney Viscosity ($ML_{1+10}(100°$ C.))
The Mooney viscosity was determined in accordance with ASTM-D 1646 and JIS-K 6300. The measurement temperature is 100° C.
(5) Fatigue Resistance Test
De Mattia flex fatigue test according to JIS K6260 was performed at 25° C., 150° C., and 5 Hz.
(6) Compression Set Test
Compression set was measured according to JIS K6262, using O rings of P24 size under conditions of measurement temperature: 150° C., compression ratio: 25%, and test time: 72 hours.
In the examples and comparative examples, the following fluororubbers, carbon black, cross-linking agents and cross-linking accelerators were used.
(Fluororubber)
A1: Pure water (1.7 L), a 50% aqueous solution of $CH_2=CFCF_2OCF(CF_3)CF_2OCF(CF_3)COONH_4$ (0.17 g), and a 50% aqueous solution of $F(CF_2)_5COONH_4$ (6.8 g) were charged into a 3-L stainless-steel autoclave, and the air inside the system was sufficiently replaced with nitrogen gas. The mixture was stirred at 600 rpm and heated to 80° C., and then monomers were injected under pressure so that the initial monomer ratio in the tank was VdF/HFP=45/55 mol % and 1.52 MPa was achieved. A polymerization initiator solution prepared by dissolving APS (60 mg) into pure water (5 ml) was injected under nitrogen gas pressure, and thus a reaction was initiated. When the internal pressure was down to 1.42 MPa as the polymerization proceeded, a mixed monomer (VdF/HFP=76/24 mol %), which are additional monomers, was injected under pressure until the internal pressure reached 1.52 MPa. At this time, a diiodide compound $I(CF_2)_4I$ (1.96 g) was injected under pressure. While the pressure was repeatedly increased and decreased, an aqueous solution of APS (60 mg)/pure water (5 ml) was injected under nitrogen gas pressure every 3 hours, and thereby the polymerization reaction was continued. As 600 g of the mixed monomer was added, unreacted monomers were removed and the autoclave was cooled down. Thereby, 628 g of fluororubber dispersion with a solid content concentration of 26.6% by mass was obtained. Polymerization time was 7.5 hours. NMR analysis on the fluororubber showed that the copolymer ratio was VdF/HFP=76/24 (mol %), and the Mooney viscosity ($ML_{1+10}$ (100° C.)) was 89. This fluororubber was named Fluororubber A1.
(Carbon Black)
B1: HAF ($N_2SA$=79 $m^2$/g, DBP oil absorption=101 ml/100 g), "SEAST 3" (trade name, Tokai Carbon Co., Ltd.)
B2: ISAF ($N_2SA$=119 $m^2$/g, DBP oil absorption=114 ml/100 g), "SEAST 6" (trade name, Tokai Carbon Co., Ltd.)
(Cross-Linking Agent)
C1: 2,5-dimethyl-2,5-di(t-butylperoxy)hexane, "PERHEXA 25B" (trade name, NOF Corp.)
(Cross-Linking Accelerator)
Triallyl isocyanurate (TRIC), "TRIC" (trade name, Nippon Kasei Chemical Co., Ltd.)
(Processing Aid)
Stearylamine (FARMIN 86T, Kao Corp.)
Stearic acid (Kanto Chemical Co., Inc.)
(Acid Acceptor)
Zinc oxide (#1, Sakai Chemical Industry Co., Ltd.)

Example 1

One hundred parts by mass of Fluororubber (A1) was mixed with 10 parts by mass of Carbon black (B1), 0.5 parts by mass of stearylamine, and 1.0 part by mass of zinc oxide using a mixer (MixLabo 0.5 L, MORIYAMA COMPANY., Ltd., rotor diameter: 6.6 cm, tip clearance: 0.05 cm) under the mixing conditions of front rotor speed: 60 rpm and back rotor speed: 50 rpm. Thereby, a fluororubber precompound (D1) was prepared. The maximum temperature of the discharged mixed product was 154° C.
Subsequently, δG' of the obtained fluororubber precompound (D1) was determined by the dynamic viscoelasticity test 2. The results are shown in Table 1.
Thereafter, 111.5 parts by mass of the fluororubber precompound (D1) was mixed with a cross-linking agent (1 part by mass), a cross-linking accelerator (TRIC, 0.5 parts by mass), and stearylamine (0.5 part by mass) for 30 minutes using an 8-inch open roll mixer (KANSAI ROLL Co., Ltd.) under the mixing conditions of front roll speed: 21 rpm, back roll speed: 19 rpm, and gap distance between rolls: 0.1 cm. Thereby, a fluororubber full compound was prepared. The maximum temperature of the discharged mixed product was 71° C.
Further, this fluororubber full compound was pressed at 160° C. for 30 minutes to be cross-linked, so that a 2-mm thick sheet specimen was produced. Using the obtained cross-linked sheet, the tensile strength at break and elongation at break were measured. Also, fatigue resistance test and compression set test were performed. Table 1 shows the results.

Furthermore, the obtained cross-linked fluororubber was subjected to the dynamic viscoelasticity test 1, and the loss modulus E" and storage modulus E' were determined. Table 1 shows the results.

Example 2

Except that the carbon black (B1) was replaced with the carbon black (B2), mixing and pressing were performed to provide a cross-linked sheet in the same manner as Example 1. Then, the mechanical properties of the sheet were measured. The results are shown in Table 1.

Examples 3 to 6

Except that the compositions of fluororubber precompound and fluororubber full compound were changed as shown in Table 2 and that secondary curing in an oven was performed in addition to press cross-linking, mixing and pressing were performed to provide cross-linked sheets in the same manner as Example 1. Then, the mechanical properties of the sheets were measured. The results are shown in Table 2.

TABLE 1

|  | Example 1 | Example 2 |
|---|---|---|
| Composition of fluororubber precompound (parts by mass) |  |  |
| Fluororubber (A1) | 100 | 100 |
| Carbon black (B1) | 10 | — |
| Carbon black (B2) | — | 10 |
| Zinc oxide | 1.0 | 1.0 |
| Stearylamine | 0.5 | 0.5 |
| Stearic acid | — | — |
| Maximum temperature of discharged mixed product (° C.) | 154 | 162 |
| Dynamic viscoelasticity test 2 (100° C.) |  |  |
| Difference δG' (kPa) | 180 | 190 |
| Compostion of fluororubber full compound (parts by mass) |  |  |
| Fluororubber precompound (D1) | 111.5 | — |
| Fluororubber precompound (D2) | — | 111.5 |
| TAIC | 0.5 | 0.5 |
| Cross-linking agent | 1.0 | 1.0 |
| Stearylamine | 0.5 | 0.5 |
| Maximum temperature of discharged mixed product (° C.) | 71 | 68 |
| Press cross-linking conditions | 160° C., 30 minutes | 160° C., 30 minutes |
| Conditions of secondary curing in an oven | — | — |
| Mechanical properties of cross-linked product |  |  |
| Measurement temperature 25° C. |  |  |
| Tesile strength at break (MPa) | 17.2 | 17.6 |
| Elongation at break (%) | 868 | 862 |
| Measurement temperature 160° C. |  |  |
| Tensile strength at breal (MPa) | 1.6 | 1.9 |
| Eelongation at break (%) | 342 | 314 |
| Measurement temperature 200° C. |  |  |
| Tesile strength at break (MPa) | 1.4 | 1.5 |
| Elongation at break (%) | 118 | 133 |
| Measurement temperature 230° C. |  |  |
| Tensile strength at breal (MPa) | 1.1 | 1.3 |
| Eelongation at break (%) | 110 | 121 |
| Fatigue resistance test (bending times until break) |  |  |
| Measurement temperature 25° C. | 700000 | 700000 |
| Measurement temperature 150° C. | 3500 | 4500 |
| Dynamic viscoelasticity test 1 (160° C.) |  |  |
| Storage modulus E' (kPa) | 2621 | 2760 |
| Loss modulus E" (kPa) | 559 | 602 |
| Compression set test (%) |  |  |
| Measurement temperature 150° C. | 32 | 37 |

TABLE 2

|  | Example 3 | Example 4 | Example 5 | Example 6 |
|---|---|---|---|---|
| Composition of fluororubber precompound (parts by mass) |  |  |  |  |
| Fluororubber (A1) | 100 | 100 | 100 | 100 |
| Carbon black (B1) | — | — | — | — |
| Carbon black (B2) | 20 | 20 | 30 | 30 |
| Zinc oxide | — | — | — | — |
| Stearylamine | — | — | — | — |
| Stearic acid | 0.5 | 0.5 | 0.5 | 0.5 |
| Maximum temperature of discharged mixed product (° C.) | 167 | 164 | 176 | 174 |
| Dynamic viscoelasticity test 2 (100° C.) |  |  |  |  |
| Difference δG' (kPa) | 640 | 635 | 1542 | 1589 |
| Compostion of fluororubber full compound (parts by mass) |  |  |  |  |
| Fluororubber precompound (D1) | — | — | — | — |
| Fluororubber precompound (D2) | 120.5 | 120.5 | 130.5 | 130.5 |
| TAIC | 1 | 3 | 1 | 3 |
| Cross-linking agent | 1.0 | 1.0 | 1.0 | 1.0 |

TABLE 2-continued

|  | Example 3 | Example 4 | Example 5 | Example 6 |
|---|---|---|---|---|
| Stearylamine | — | — | — | — |
| Maximum temperature of discharged mixed product (° C.) | 75 | 75 | 76 | 77 |
| Press cross-linking conditions | 160° C., 30 minutes | 160° C., 30 minutes | 160° C., 30 minutes | 160° C., 30 minutes |
| Conditions of secondary curing in an oven | 180° C., 4 hours | 180° C., 4 hours | 180° C., 4 hours | 180° C., 4 hours |
| Mechanical properties of cross-linked product |  |  |  |  |
| Measurement temperature 25° C. |  |  |  |  |
| Tesile strength at break (MPa) | 27.2 | 31 | 23.7 | 26.5 |
| Elongation at break (%) | 517 | 434 | 462 | 377 |
| Measurement temperature 160° C. |  |  |  |  |
| Tensile strength at breal (MPa) | 4.4 | 4.9 | 5.5 | 6.4 |
| Eelongation at break (%) | 265 | 170 | 243 | 228 |
| Measurement temperature 200° C. |  |  |  |  |
| Tesile strength at break (MPa) | 3.9 | 4.1 | 4.9 | 5.6 |
| Elongation at break (%) | 221 | 141 | 238 | 190 |
| Measurement temperature 230° C. |  |  |  |  |
| Tensile strength at breal (MPa) | 2.6 | 3.7 | 3.9 | 3.3 |
| Eelongation at break (%) | 203 | 110 | 189 | 130 |
| Fatigue resistance test (bending times until break) |  |  |  |  |
| Measurement temperature 25° C. | 950000 or more | 180000 | 950000 or more | 380000 |
| Measurement temperature 150° C. | 18000 | 3500 | 12000 | 66000 |
| Dynamic viscoelasticity test 1 (160° C.) |  |  |  |  |
| Storage modulus E' (kPa) | 7631 | 8788 | 12551 | 14317 |
| Loss modulus E" (kPa) | 1931 | 2105 | 2522 | 2711 |
| Compression set test (%) |  |  |  |  |
| Measurement temperature 150° C. | 39 | 26 | 51 | 37 |

The invention claimed is:

1. A diaphragm comprising:
    a cross-linked fluororubber layer obtained by cross-linking a fluororubber composition containing a fluororubber (A) and a carbon black (B),
    the cross-linked fluororubber layer having a loss modulus E" of 400 kPa or higher and 6,000 kPa or lower determined by a dynamic viscoelasticity test under conditions of measurement temperature: 160° C., tensile strain: 1%, static tension under a constant static load condition for measuring strain distribution: 157 cN, and frequency: 10 Hz,
    wherein the carbon black (B) is a carbon black having a nitrogen adsorption specific surface area ($N_2SA$) of 79 $m^2/g$ or larger,
    wherein the fluororubber (A) is a vinylidene fluoride fluororubber, and
    wherein the vinylidene fluoride fluororubber is a vinylidene fluoride (VdF)/hexafluoropropylene (HFP) copolymer.

2. The diaphragm according to claim 1,
    wherein the cross-linked fluororubber layer has a storage modulus E' of 1,500 kPa or higher and 20,000 kPa or lower determined by a dynamic viscoelasticity test under conditions of measurement temperature: 160° C., tensile strain: 1%, static tension under a constant static load condition for measuring strain distribution: 157 cN, and frequency: 10 Hz.

3. The diaphragm according to claim 1,
    wherein the fluororubber composition contains 5 to 50 parts by mass of the carbon black (B) to 100 parts by mass of the fluororubber (A).

4. The diaphragm according to claim 1,
    wherein the carbon black (B) is a carbon black having a nitrogen adsorption specific surface area ($N_2SA$) of 79 to 180 $m^2/g$ and a dibutyl phthalate (DBP) oil absorption of 40 to 180 mL/100 g.

5. The diaphragm according to claim 1,
    wherein the fluororubber composition further contains a cross-linking agent (C) and/or a cross-linking aid (D).

6. The diaphragm according to claim 1,
    wherein the cross-linked fluororubber layer has an elongation at break at 160° C. of 100 to 700%.

7. The diaphragm according to claim 1,
    wherein the cross-linked fluororubber layer has a tensile strength at break at 160° C. of 1.0 to 20 MPa.

8. The diaphragm according to claim 1,
    wherein the cross-linked fluororubber layer has an elongation at break at 200° C. of 90 to 700%.

9. The diaphragm according to claim 1,
    wherein the cross-linked fluororubber layer has a tensile strength at break at 200° C. of 1.0 to 20 MPa.

10. The diaphragm according to claim 1,
    wherein the cross-linked fluororubber layer has an elongation at break at 230° C. of 80 to 700%.

11. The diaphragm according to claim 1,
    wherein the cross-linked fluororubber layer has a tensile strength at break at 230° C. of 1.0 to 20 MPa.

* * * * *